(12) United States Patent
Sangem et al.

(10) Patent No.: US 8,326,926 B2
(45) Date of Patent: Dec. 4, 2012

(54) DISTRIBUTED ELECTRONIC DESIGN AUTOMATION ARCHITECTURE

(75) Inventors: Venkanna Sangem, Hyderabad (IN); Srinivas Mandavilli, Hyderabad (IN); Chandra Sekhar Akella, Hyderabad (IN)

(73) Assignee: Mentor Graphics Corporation, Wilsonville, OR (US)

( * ) Notice: Subject to any disclaimer, the term of this patent is extended or adjusted under 35 U.S.C. 154(b) by 1572 days.

(21) Appl. No.: 11/223,976

(22) Filed: Sep. 13, 2005

(65) Prior Publication Data

US 2007/0073809 A1    Mar. 29, 2007

(51) Int. Cl.
G06F 15/16   (2006.01)
G06F 15/173   (2006.01)
G06F 15/04   (2006.01)
G06F 17/50   (2006.01)
G06F 3/00   (2006.01)

(52) U.S. Cl. ........ 709/204; 709/217; 709/223; 716/139; 715/762; 715/751

(58) Field of Classification Search .......... 709/204–205, 709/220, 248, 203; 707/201, 203; 715/964–969, 715/751, 753–772
See application file for complete search history.

(56) References Cited

U.S. PATENT DOCUMENTS

| | | | |
|---|---|---|---|
| 5,107,443 A | 4/1992 | Smith | |
| 5,258,920 A | 11/1993 | Haller et al. | |
| 5,295,081 A | 3/1994 | Habra | |
| 5,333,312 A | 7/1994 | Wang | |
| 5,333,315 A | 7/1994 | Saether et al. | |
| 5,333,316 A | 7/1994 | Champagne et al. | |
| 5,339,388 A | 8/1994 | Bates et al. | |
| 5,392,400 A | 2/1995 | Berkowitz | |
| 5,452,218 A | 9/1995 | Tucker et al. | |
| 5,515,491 A | 5/1996 | Bates et al. | |
| 5,544,067 A | 8/1996 | Rostoker et al. | |
| 5,555,388 A | 9/1996 | Shaughnessy | |
| 5,583,993 A | 12/1996 | Foster et al. | |
| 5,604,680 A | 2/1997 | Bamji et al. | |
| 5,745,747 A | 4/1998 | Chang et al. | |
| 5,751,597 A | 5/1998 | Okano et al. | |

(Continued)

FOREIGN PATENT DOCUMENTS

EP        0550370        7/1993

(Continued)

OTHER PUBLICATIONS

English Abstract of JP2003-186914, Jul. 4, 2003.

(Continued)

Primary Examiner — Ian N Moore
Assistant Examiner — Jenee Alexander
(74) Attorney, Agent, or Firm — Banner & Witcoff, Ltd.

(57) ABSTRACT

A copy of a design is stored at each of multiple clients. When a client user provides input indicating a wish to modify the design in some way, the input is captured and one or more commands created. The commands are forwarded to a server, which queues commands received from all of the clients and then forwards each of those commands back to each of the clients. Upon receiving commands from the server, each of the clients executes those commands in the order received. Each client also maintains data indicating settings for all clients in a current editing session. Before executing a design changing command, each client adjusts its settings to match those of the client from which that command originated.

19 Claims, 24 Drawing Sheets

U.S. PATENT DOCUMENTS

| | | | |
|---|---|---|---|
| 5,806,058 A | 9/1998 | Mori et al. | |
| 5,809,240 A | 9/1998 | Kumagai | |
| 5,826,265 A | 10/1998 | Van Huben et al. | |
| 5,892,900 A | 4/1999 | Ginter et al. | |
| 5,948,057 A * | 9/1999 | Berger et al. | 709/205 |
| 5,950,201 A | 9/1999 | Van Huben et al. | |
| 5,966,707 A | 10/1999 | Van Huben et al. | |
| 5,983,277 A | 11/1999 | Heile et al. | |
| 6,023,565 A | 2/2000 | Lawman et al. | |
| 6,026,230 A | 2/2000 | Lin et al. | |
| 6,094,654 A | 7/2000 | Van Huben et al. | |
| 6,094,658 A | 7/2000 | Araki | |
| 6,110,213 A | 8/2000 | Vinciarelli et al. | |
| 6,110,223 A | 8/2000 | Southgate et al. | |
| 6,134,549 A * | 10/2000 | Regnier et al. | 707/9 |
| 6,134,705 A | 10/2000 | Pedersen et al. | |
| 6,182,115 B1 | 1/2001 | Cuomo et al. | |
| 6,240,414 B1 | 5/2001 | Beizer et al. | |
| 6,289,254 B1 | 9/2001 | Shimizu et al. | |
| 6,327,594 B1 | 12/2001 | Van Huben et al. | |
| 6,356,796 B1 | 3/2002 | Spruiell et al. | |
| 6,418,552 B1 | 7/2002 | Osborn | |
| 6,424,959 B1 | 7/2002 | Bennett et al. | |
| 6,442,570 B1 | 8/2002 | Wu | |
| 6,484,177 B1 | 11/2002 | Van Huben et al. | |
| 6,530,065 B1 | 3/2003 | McDonald et al. | |
| 6,553,555 B1 | 4/2003 | Green et al. | |
| 6,578,174 B2 | 6/2003 | Zizzo | |
| 6,594,799 B1 | 7/2003 | Robertson et al. | |
| 6,611,848 B1 * | 8/2003 | Bradley | 707/201 |
| 6,654,747 B1 | 11/2003 | Van Huben et al. | |
| 6,671,699 B1 | 12/2003 | Black et al. | |
| 6,678,871 B2 | 1/2004 | Takeyama et al. | |
| 6,678,876 B2 | 1/2004 | Stevens et al. | |
| 6,678,877 B1 | 1/2004 | Perry et al. | |
| 6,684,379 B2 | 1/2004 | Skoll et al. | |
| 6,687,710 B1 | 2/2004 | Dey | |
| 6,708,313 B2 | 3/2004 | Pfeil et al. | |
| 6,711,718 B2 | 3/2004 | Pfeil et al. | |
| 6,721,922 B1 | 4/2004 | Walters et al. | |
| 6,751,781 B2 | 6/2004 | Lin et al. | |
| 6,782,511 B1 | 8/2004 | Frank et al. | |
| 6,845,492 B1 * | 1/2005 | Frank et al. | 716/112 |
| 6,851,094 B1 | 2/2005 | Robertson et al. | |
| 6,851,100 B1 | 2/2005 | You et al. | |
| 6,931,369 B1 | 8/2005 | Perry et al. | |
| 6,983,232 B2 | 1/2006 | Nguyen et al. | |
| 6,983,434 B1 | 1/2006 | Frank et al. | |
| 7,020,853 B2 | 3/2006 | Skoll et al. | |
| 7,024,433 B2 | 4/2006 | Arai et al. | |
| 7,036,101 B2 | 4/2006 | He et al. | |
| 7,039,892 B2 | 5/2006 | Mantey et al. | |
| 7,076,491 B2 | 7/2006 | Tsao | |
| 7,103,434 B2 | 9/2006 | Chernyak et al. | |
| 7,134,096 B2 | 11/2006 | Brathwaite et al. | |
| 7,143,134 B2 | 11/2006 | Petrie et al. | |
| 7,143,341 B1 | 11/2006 | Kohli | |
| 7,219,311 B2 | 5/2007 | Koga et al. | |
| 7,240,309 B2 | 7/2007 | Saito et al. | |
| 7,246,055 B1 | 7/2007 | Singh | |
| 7,305,648 B2 * | 12/2007 | Petunin et al. | 716/15 |
| 7,337,093 B2 | 2/2008 | Ramani et al. | |
| 7,546,571 B2 * | 6/2009 | Mankin et al. | 715/751 |
| 2002/0059054 A1 | 5/2002 | Bade et al. | |
| 2002/0069220 A1 | 6/2002 | Tran | |
| 2002/0120858 A1 | 8/2002 | Porter et al. | |
| 2002/0144212 A1 | 10/2002 | Lev et al. | |
| 2002/0188910 A1 | 12/2002 | Zizzo | |
| 2003/0009727 A1 | 1/2003 | Takeyama et al. | |
| 2003/0018655 A1 | 1/2003 | Arroyo et al. | |
| 2003/0038850 A1 * | 2/2003 | Stevens | 345/964 |
| 2003/0101425 A1 | 5/2003 | Makinen | |
| 2003/0131332 A1 | 7/2003 | Pfeil et al. | |
| 2004/0093397 A1 | 5/2004 | Chiroglazov et al. | |
| 2004/0199891 A1 | 10/2004 | Bentley et al. | |
| 2004/0210854 A1 * | 10/2004 | Pfeil et al. | 716/1 |
| 2004/0225988 A1 | 11/2004 | Petunin et al. | |
| 2004/0268283 A1 * | 12/2004 | Perry et al. | 716/11 |
| 2005/0044518 A1 * | 2/2005 | Petunin et al. | 716/11 |
| 2005/0080502 A1 | 4/2005 | Chernyak | |
| 2005/0108663 A1 | 5/2005 | Bentley et al. | |
| 2005/0114821 A1 | 5/2005 | Petunin et al. | |
| 2005/0114865 A1 | 5/2005 | Petunin | |
| 2005/0125763 A1 | 6/2005 | Lin et al. | |
| 2005/0131783 A1 | 6/2005 | Jin | |
| 2005/0160396 A1 | 7/2005 | Chadzynski | |
| 2005/0237776 A1 | 10/2005 | Gropper et al. | |
| 2005/0246672 A1 | 11/2005 | Bois et al. | |
| 2005/0283746 A1 * | 12/2005 | Tsai et al. | 716/4 |
| 2006/0095882 A1 * | 5/2006 | Mankin et al. | 716/11 |
| 2006/0101368 A1 * | 5/2006 | Kesarwani et al. | 716/11 |
| 2008/0034342 A1 * | 2/2008 | Petunin et al. | 716/15 |
| 2008/0059932 A1 | 3/2008 | Pfeil et al. | |

FOREIGN PATENT DOCUMENTS

| | | |
|---|---|---|
| EP | 0558006 | 9/1993 |
| EP | 750267 | 6/1995 |
| JP | 62203728 | 9/1987 |
| JP | 02-048774 | 2/1990 |
| JP | 02-056070 | 2/1990 |
| JP | 02-245865 | 10/1990 |
| JP | 3278274 | 12/1991 |
| JP | 04-068470 | 3/1992 |
| JP | 4115369 | 4/1992 |
| JP | 04-362783 | 12/1992 |
| JP | 05-073630 | 3/1993 |
| JP | 0574942 | 3/1993 |
| JP | 05-324360 | 7/1993 |
| JP | 05-242174 | 9/1993 |
| JP | 06203108 | 7/1994 |
| JP | 07175842 | 7/1995 |
| JP | 08-235233 | 9/1996 |
| JP | 0962726 | 3/1997 |
| JP | 09-212530 | 8/1997 |
| JP | 09-288690 | 11/1997 |
| JP | 10-105586 | 4/1998 |
| JP | 10222549 | 8/1998 |
| JP | 10307855 | 11/1998 |
| JP | 11-288428 | 10/1999 |
| JP | 2003-186914 | 7/2003 |
| WO | 03050751 | 5/2003 |
| WO | 03050726 | 6/2003 |
| WO | WO 03/050726 | 6/2003 |
| WO | 03088095 | 10/2003 |

OTHER PUBLICATIONS

Machine-Generated English Translation of Portions of JP2003-186914, Jul. 4, 2003.
English Translation of Abstract and Claims of JP2003-186914, Jul. 4, 2003.
U.S. Appl. No. 10/960,793, filed Oct. 8, 2004.
U.S. Appl. No. 10/935,749, filed Sep. 8, 2004.
U.S. Appl. No. 60/341,037, filed Dec. 10, 2001.
Michael K.W. Wu, et al., "Development of an Integrated CAD Tool for Switching Power Supply Design with EMC Performance Evaluation," IEEE Transactions on Industry Applications, vol. 34, No. 2, pp. 364-373, Mar.-Apr. 1998.
Geppert, L., "IC Design on the World Wide Web," IEEE Spectrum, Oct. 2001, pp. 31-36.
Printout of web page at <http://www.stella.co.jp/system/data.htm> and English language translation thereof; date of first publication unknown, but prior to Sep. 9, 2003; 2 pages.
Printout of web page at <http://www.stella.co.jp/system/faq.htm> and English language translation thereof; date of first publication unknown, but prior to Nov. 18, 2003; 5 pages.
Printout of web page at <http://www.stella.co.jp/system/multi.htm> and English language translation thereof; date of first publication unknown, but prior to Sep. 9, 2003; 2 pages.
Printout of web page at <http://www.stella.co.jp/system/option.htm> and English language translation thereof; date of first publication unknown, but prior to Sep. 9, 2003; 2 pages.
Printout of web page at <http://www.stella.co.jp/system/pcb_cad.htm> and English language translation thereof; date of first publication unknown, but prior to Sep. 9, 2003; 2 pages.

Printout of web page at <http://www.stella.co.jp/system/print.htm> and English language translation thereof; date of first publication unknown, but prior to Sep. 9, 2003; 3 pages.
Printout of web page at <http://www.stella.co.jp/system/stella_station.htm> and English language translation thereof; date of first publication unknown, but prior to Nov. 18, 2003; 3 pages.
Printout of web page at <http://www.stella.co.jp/system/system.htm> and English language translation thereof; date of first publication unknown, but prior to Sep. 9, 2003; 2 pages.
English language translation of web page formerly available at <http://www.ydc.co.jp/cad/epsilon/productC3Design/>; date of first publication unknown, but prior to Feb. 17, 2004; 6 pages.
CAD Framework Initiative, Inc., Printed from <http://www.si2.org> on Jun. 23, 2004 (date of first publication unknown).
Horn, I., et al., "Estimation of the Number of routing Layers and Total Wirelength in a PCT Through Wiring Distribution Analysis", Design Automation Conference, 1996 Proceedings EURO-DAC '06, Sep. 16-20, 1996, pp. 31-315.
EP Search Report for EP02795797 dated Oct. 20, 2006.
International Search Report of PCT/US02/39347 dated Mar. 27, 2003.
International Search Report of PCT/US02/39394 dated Jun. 19, 2003.
Translation of an Office Action for JP2003551712 dated Aug. 21, 2006.
Translation of an Office Action for JP2003551734 dated Aug. 21, 2006.
Hardwick, M., et al., "Using a Relational Database as an Index to a Distributed Object Database in Engineering Design Systems", IEEE, Oct. 16, 1989, pp. 4-11.
Anupam, V., et al., "Collaborative Multimedia Scientific Design in SHASTRA", 1993, pp. 1-12.
Anupam V., et al., "SHASTRA: Multimedia Collaborative Design Environment," IEEE Multimedia, vol. 1, No. 2, Jun. 21, 1994, pp. 39-49.
Anupam V., et al., "SHASTRA An Architecture for Development of Collaborative Applications", Enabling Technologies: Infrastructure for Collaborative Enterprises, Apr. 20-22, 1993, pp. 155-156.
Honghai, Shen, et al., "Access Control for Collaborative Environments", Oct. 31, 1992, pp. 51-58.
N. Shyamsundar, et al., "Internet-based Collaborative Product Design with Assembly Features and Virtual Design Spaces", Jun. 5, 2001, pp. 637-651.
"Version Management with CVS for CVS 1.12.9", Chapter 10: Multiple Developers, retrieved from the Internet: <http://ftp.gnu.org/non-gnu/cvs/source/feature/1.12.9/cederqvist-1.12.9.p> retrieved on Jan. 24, 2005; pp. 65-74.
International Search Report and Written Opinion of PCT/US2006/035374 dated Feb. 13, 2007.
International Preliminary Report on patentability for PCT/US2006/035374 dated Mar. 18, 2008.
Mar. 14, 2008 Official Communication in European Patent Application 02 797 245 (6 pages).
Mar. 25, 2008 Third Party Submission in European Patent Application 02 797 245, with attachments (44 pages).
Translation of Jan. 8, 2008 Decision of Refusal in Japanese Patent Application 2003-551734 (3 pages).
May 30, 2007 Office Action in European Patent Application 02 797 245 (6 pages).
Translation of May 29, 2007 Office Action in Japanese Patent Application 2003-551734 (3 pages).
Supplementary European Search Report for EP 02 79 5797 dated Jul. 3, 2007.
May 14, 2007 Letter supplementing the Search Report and the Supplementary Partial European Search Report dated Oct. 20, 2006.
Feb. 6, 2008 Office Action in EP 02 795 797.6 (3 pages).
English translation of Mar. 8, 2006, submission by undisclosed third party in Japanese Patent Application 2003-551734 (2 pages).
English translation of Mar. 8, 2006, submission by undisclosed third party in Japanese Patent Application 2003-551712 (2 pages).
English translation of Mar. 29, 2007, submission by undisclosed third party in Japanese Patent Application 2003-551734 (7 pages).

English translation of Oct. 25, 2007, submission by undisclosed third party in Japanese Patent Application 2003-551734 (4 pages).
English translation of Sep. 29, 2006, submission by undisclosed third party in Japanese Patent Application 2003-551712 (15 pages).
English translation of Apr. 4, 2007, submission by undisclosed third party in Japanese Patent Application 2003-551734 (9 pages).
English translation of Oct. 25, 2007, submission by undisclosed third party in Japanese Patent Application 2003-551712 (4 pages).
Konduri, et al., "A Framework for Collaborative Design and Distributed Web-Based Design", 1999, pp. 898-903.
Konduri, et al., "Vela Project on Collaborative Distributed Design: New Client/Server Implementations", May 6, 1999, pp. 1-8.
Datasheet for "Allegro PCB Design 220", by Cadence; Mar. 9, 2004, 8 pages.
Saha, et al., "Web-Based Distributed VLSI Design", MIT, published Jan. 4-7, 1998, pp. 449-454.
"Vela Project—Globally Distributed Microsystem Design" by CBL, Jun. 1998, 23 pages.
Google™ Search bearing date of Apr. 28, 2008; provided by examiner of U.S. Appl. No. 10/960,793.
English Translation of Apr. 15, 2008 Notice of Grounds for Rejection for JP2007-247641.
International Search Report and Written Opinion for PCT/US04/37183 dated May 9, 2008.
English Language Translation of Publication submission of Japanese Patent Application No. 2003-551734 dated Oct. 25, 2006.
English Language Translation of Japanese Kokai Patent Application No. Hei 5[1993]-242174 published Sep. 21, 1993 (filing No. Hei 4[1992]-41727).
English Language Translation of Japanese Kokai Patent Application No. Hei 11[1999]-288428, published Oct. 19, 1999 (filing no. Hei 10[1998]-91372).
English Language Translation of Japanese Kokai Patent Application No. Hei 9[1997]-288690, published Nov. 4, 1997 (filing no. Hei 8[1996]-122462).
English Language Translation of Japanese Kokai Patent Application No. Hei 2[1990]-245865, published Mar. 20, 1989 (filing no. Hei 1[1989]-65906).
English Language Translation of Japanese Public Patent Disclosure Bulletin No. 10105586, dated Apr. 24, 1998 (application 8-25457).
English Language Translation of Japanese Kokai Patent Application No. Hei 4[1992]-362783, published Dec. 15, 1992 (filing No. Hei 3[1991]-137766).
English Language Translation of Japanese Kokai Patent Application No. Hei 9[1997]-212530, published Aug. 15, 1997 (filing No. Hei 8[1996]-17325).
English Language Translation of Japanese Kokai Patent Application No. Hei 5[1993]-073630, published Mar. 6, 1993 (filing No. Hei 3[1991]-233515).
English Language Translation of Japanese Public Patent Disclosure Bulletin No. 08235233, dated Sep. 13, 1996 (application No. 7-38249).
English Language Translation of Japanese Kokai Patent Application No. Hei 2[1990]-056070, published Aug. 20, 1988 (filing No. Sho 63[1998]-205677).
English Language Translation of Japanese Kokai Patent Application No. Hei 7[1995]-175842 published Jul. 14, 1995 (filing No. Hei 5[1993]-345183).
English Language Translation of Japanese Kokai Patent Application No. Hei 4[1992]-293169 published Oct. 16, 1992 (filing No. Hei 3[1991]-57351).
English Language Translation of Japanese Public Patent Disclosure Bulletin No. 0696160, dated Apr. 8, 1994 (application No. 04244646).
English Language Translation of Japanese Public Patent Disclosure Bulletin No. 06203108, dated Jul. 22, 1994 (application No. 5-154).
English Translation of Toshio Hoshi, "e-PAL 2000" Printed Circuit Board CAD/CAM System, Denshi Zairyo [Electronic Parts and Materials], Oct. 2001, pp. 153-156 (Japanese original included).
English Translation of Yoshiki Koyanagi: Stella Station Multi CAD/CAM System for the Next Generation of Printed Circuit Boards, Denshi Zairyo [Electronic Parts and Materials], Oct. 2000, pp. 96-101 (Japanese original included).

English translation of Japanese Kokai Patent Application No. Hei 7 [1995] - 98726, published Apr. 11, 1995 (filing No. Hei 5[1993]-311532), pp. 6-37.

English translation of Japanese Kokai Patent Application No. Hei 4[1992]-68470, published Mar. 4, 1992 (filing No. Hei 2[1990]-180448).

English translation of Japanese Kokai Patent Application No. Hei 5[1993]-74942, published Mar. 26, 1993 (filing No. Hei 3[1991]-259923).

English translation of Japanese Kokai Patent Application No. Hei 10[1998]-307855, published Nov. 17, 1998 (filing No. Hei 9[1997]-118134).

Translation of Japanese Patent Application No. Hei 2[1990]-48774, published Feb. 19, 1990 (filing No. Sho 63 [1988]-199358).

English language translation of Japanese Public Patent Disclosure Bulletin No. 9-62726, dated Mar. 7, 1997 (application 7-220142).

English translation of an Office Action for JP2003551712 dated May 29, 2007.

English translation of Jul. 18, 2008, submission by undisclosed third party in European Patent Application 02 795 797.6 (4 pages).

English Translation of OA for JP2008-121618 dated Jul. 29, 2008.

Communication for EP 02795797.6-2224 dated Mar. 24, 2011.

* cited by examiner

DISTRIBUTED ELECTRONIC DESIGN AUTOMATION ARCHITECTURE

FIELD OF THE INVENTION

This invention relates to the field of electronic design automation. More specifically, embodiments of the invention pertain to architectures that allow multiple electronic design automation clients to perform operations on a common design.

BACKGROUND

Included under the broad category of "electronic design automation" are numerous software tools that assist in the development of integrated circuits (ICs), printed circuit boards (PCBs), and other electronics components and/or systems. In some cases, such software (operating on multiple computers) allows teams of designers to collaborate and simultaneously edit the same design. Those designers may be located in geographically-distant regions.

Although offering many advantages (or potential advantages), such computer-aided collaboration also presents a number of challenges. One such challenge relates to communication of design data over the Internet or other networks. Despite the complexity of many electronic designs, there is almost always a desire to minimize the amount of data that must be transmitted over a network. For example, numerous designers working on the same IC, PCB or other project may each be working from a local copy of the design. These multiple copies must be kept synchronized. Frequent synchronization is desirable so that each designer will be aware of the latest changes by other designers. However, increasing the frequency with which each local design copy is updated also increases the amount of data transmission across a network, and can result in slow system performance.

Synchronization can also pose other challenges. In some cases, the order in which certain edits are made to a design can become important. For example, dimensional rounding errors can accumulate as a design is changed. Altering the order in which those changes occur can affect the magnitude of the rounding errors. If edits to all local copies of a design are not performed in the same order, the different copies can become non-identical. Another synchronization challenge relates to conflicting edits made by different designers. Because of network latency, delays in updating a local copy of a design, or other reasons, a first designer may edit a local copy of a design without knowing that a second designer has previously made a conflicting edit. The first designer will usually be forced to reverse the edit he or she attempted to make. Although the editing software in use may automatically reverse the first user's edit, the process can still be time-consuming and inconvenient, and avoiding the need for such reversals is desirable. It would thus be helpful to avoid from the outset changing a local design copy in a manner that conflicts with another edit.

SUMMARY OF THE INVENTION

In at least some embodiments, users working at multiple clients work on the same design. A copy of the design is stored at each client. When a user provides input indicating a desire to modify the design in some way, the user's input is captured at the client and one or more commands created. The commands are not immediately executed. Instead, those commands are forwarded to a server. The server queues the commands received from all of the clients, and then forwards each of those commands back to each of the clients. Upon receiving commands from the server, each of the clients executes the commands in the order received. In this manner, all clients process design change commands in the same order.

In at least some embodiments, each client also maintains data indicating settings for each client in a current editing session. In particular, various design-editing software parameters may have values that affect the manner in which a design will be modified in response to a design change command. Those parameters may have different values in the software running on different clients. Before executing a design changing command, and so that each design change will be carried out in the same way on each client, each client resets it values for those parameters to match those of the client from which that command originated.

These and other features and advantages of the present invention will be readily apparent and fully understood from the following detailed description of preferred embodiments, taken in connection with the appended drawings.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

DETAILED DESCRIPTION OF THE PREFERRED EMBODIMENTS

Certain embodiments of the invention are herein described by reference to design of a printed circuit board (PCB). However, PCB design is only one example of an electronic design automation (EDA) environment in which embodiments of the invention may be implemented. In other embodiments, aspects of the invention may be used for other types of design activities. Throughout this specification (including the claims), "design" is used in a broad sense to refer to a collection of data relating to a particular project to develop an electronic component or system. A PCB design includes data that is associated with a PCB, and may include such things as locations of traces (or routes), trace widths, via locations, locations and parameters for other components, layer data, etc. A PCB design may also include data that controls how other types of data can be added to the design. For example, a PCB design may include design rules that limit how close traces can be placed to one another, rules that require a minimum trace length or width, rules that limit certain users to editing certain portions of the design, etc.

Figure 1A:
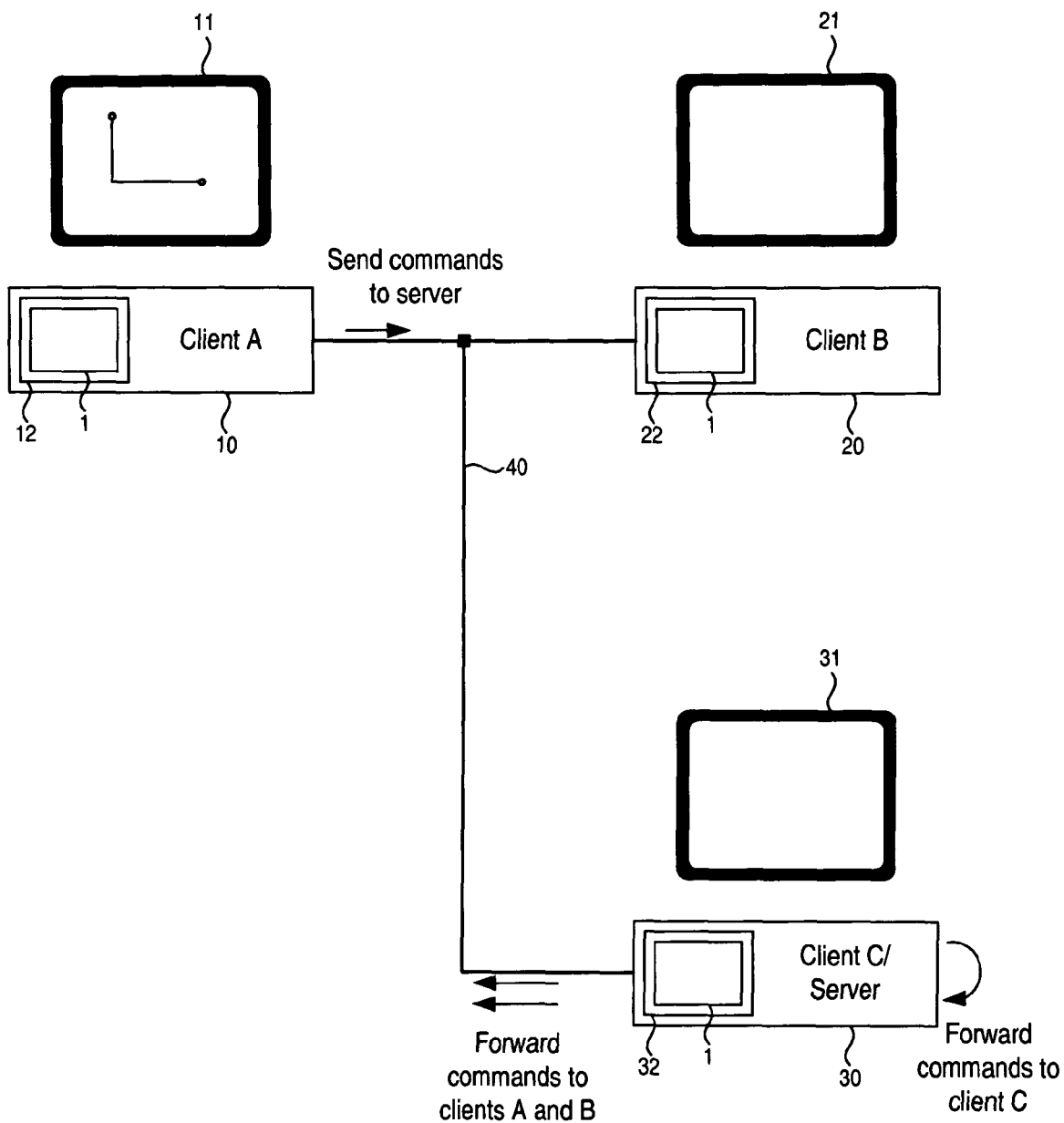
FIGS. 1A-1C are block diagrams showing implementation in a computer network of a system according to at least some embodiments.
Figure 1B:
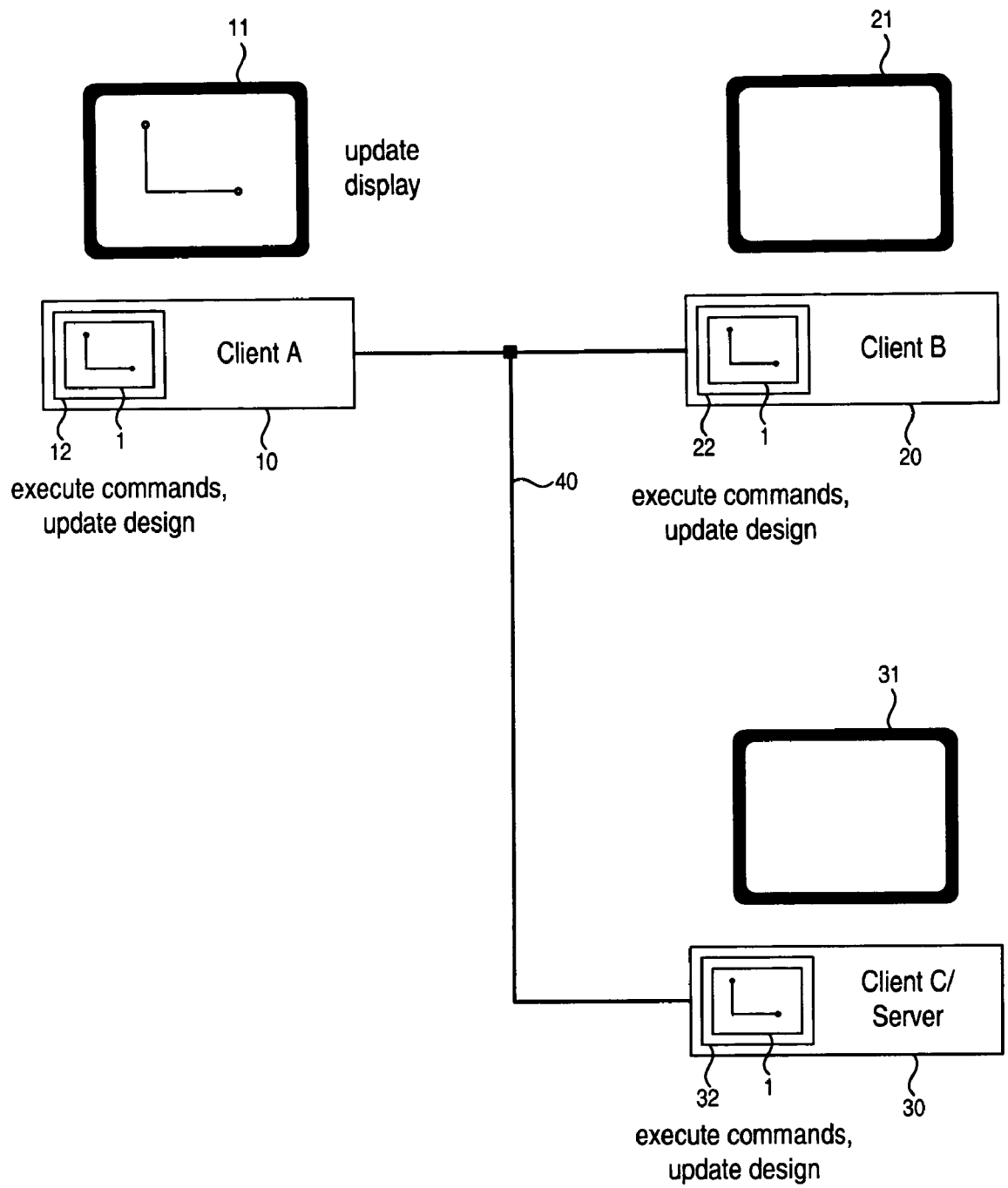

FIGS. 1A and 1B are block diagrams showing one example of the invention as implemented in a networked computing system. The system of FIG. 1A includes computers 10, 20 and 30, each of which includes a display (11, 21, 31), one or more processors (not shown), a hard disk drive (12, 22, 32), volatile memory (e.g., RAM, not shown) and other elements well-known in the art. Computer 10 is acting as a client (A) in FIG. 1A. Computer 20 is also acting as a client (B), while computer 30 is acting as both a client (C) and a server. Computers 10, 20 and 30 communicate over a network 40. Network 40 may be a local area network, a wide area network, the Internet, a wireless network, or some combination of different types of networks. Because computer networking is well known, and because the invention is not limited by the manner in which multiple computers may be in communication with one another, the details of such communication are not necessary for understanding the invention.

Stored on client A (e.g., on hard drive 12) is a copy of a PCB design 1; various features of PCB design 1 can be viewed on display 11 of client A. In FIG. 1A, the user at client A (hereinafter, "user A") has provided input so as to add a trace and two vias to PCB design 1. User A may provide this input in a variety of ways. For example, the user may select an object from a menu with a mouse, drag that object onto a displayed region of the design by moving the mouse, and then place that object onto the design by releasing a mouse button. As user A provides input to add the trace and two vias, the desired changes are not immediately made to PCB design 1. Instead, that input is captured and corresponding commands are generated. The commands are then sent by client A to the server (located at computer 30). After receiving the commands from client A, the server forwards those commands to all clients (including client A). In the case of clients A and B, those commands are forwarded over network 40. In the case of client C, those commands are simply provided by one or more server program threads executing on computer 30 to one or more client program threads also executing on computer 30. Upon receiving the client A commands from the server, and as shown in FIG. 1B, each client then executes those commands and updates its local copy of PCB design 1 to include the changes initiated by user A. For simplicity, the addition of the trace and two vias to PCB design 1 is shown graphically as a miniature version of the added features in the local copies of PCB design 1 stored at each of the clients. However, the design data may be stored in any of a variety of manners.

Design changes initiated at other clients are processed in the same way. For example, input provided by a client B user ("user B") is captured at client B, converted to appropriate commands and transmitted to the server. The server then forwards those commands to all clients for processing. Input from a client C user ("user C") is similarly captured by one or more client programming threads on computer 30, converted to appropriate commands and forwarded to one or more server programming threads on computer 30. The server programming threads then forward the user C commands to all clients for processing. As described in more detail below, the server queues commands received from the clients and forwards those commands to each client in the order received.

Figure 1C:
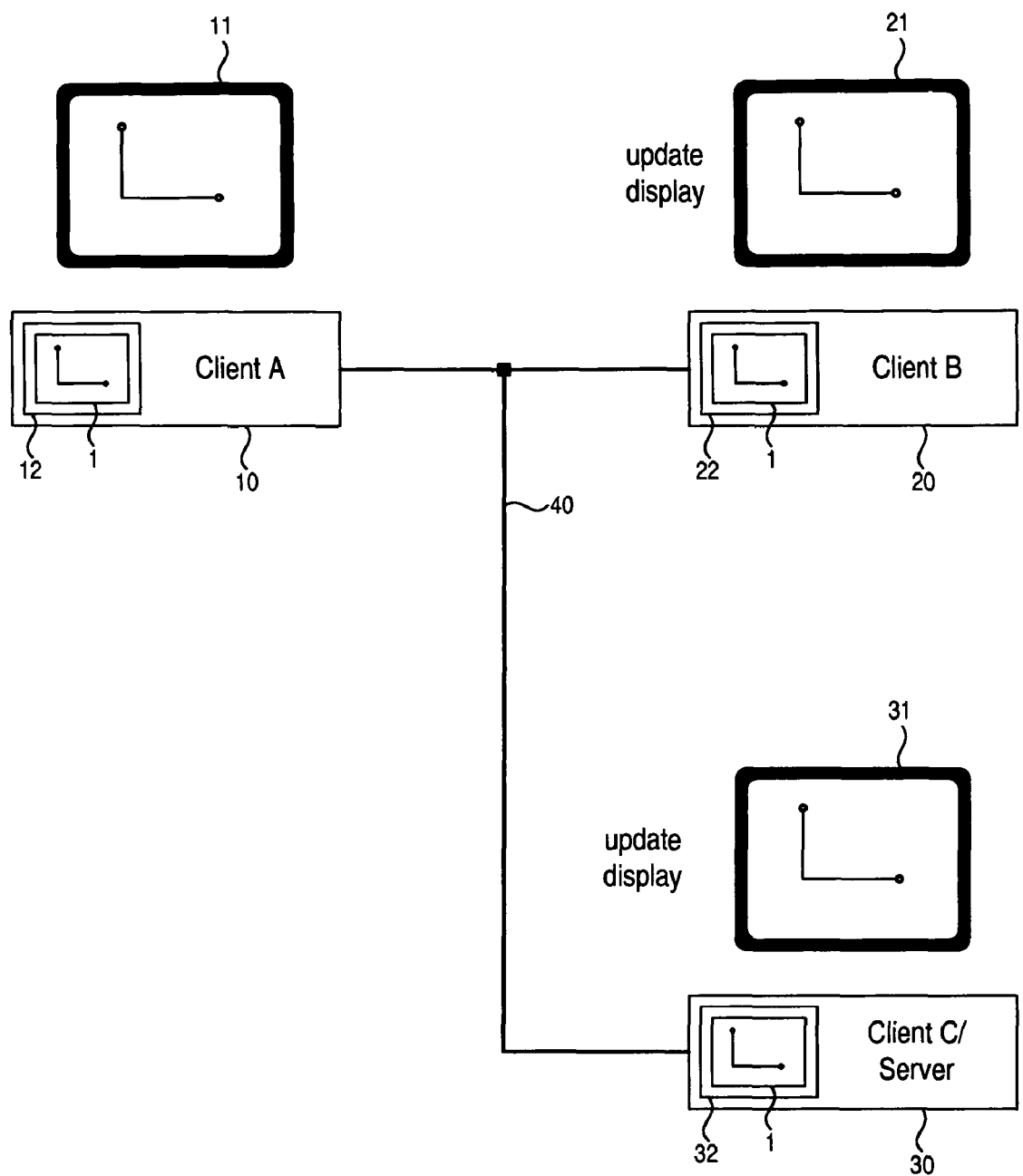

At some future time, and as shown in FIG. 1C, displays 11, 21 and 31 of computers 10, 20 and 30 may be updated to reflect the changes to PCB design 1 resulting from the commands initiated at client A. In some embodiments, a client display is updated whenever the design is modified based on a command originating from that same client. For example, execution of the command by client A in FIG. 1B results in immediate updating of display 1, as the command originated from client A. However display 21 is not updated until client B executes a command that originated at client B. Similarly, display 31 is not updated until execution at client C of a command that originated at client C. A client display may also be updated in other manners or at other times. For example, a user could specifically request (e.g., by entering a "refresh" command) that a display be updated. A display could also be updated at regular intervals (e.g., every two minutes). In some embodiments, a client display is also updated if no commands from that client have been executed within a predetermined amount of time (e.g., update after two minutes if no commands from that client executed).

Figure 2:
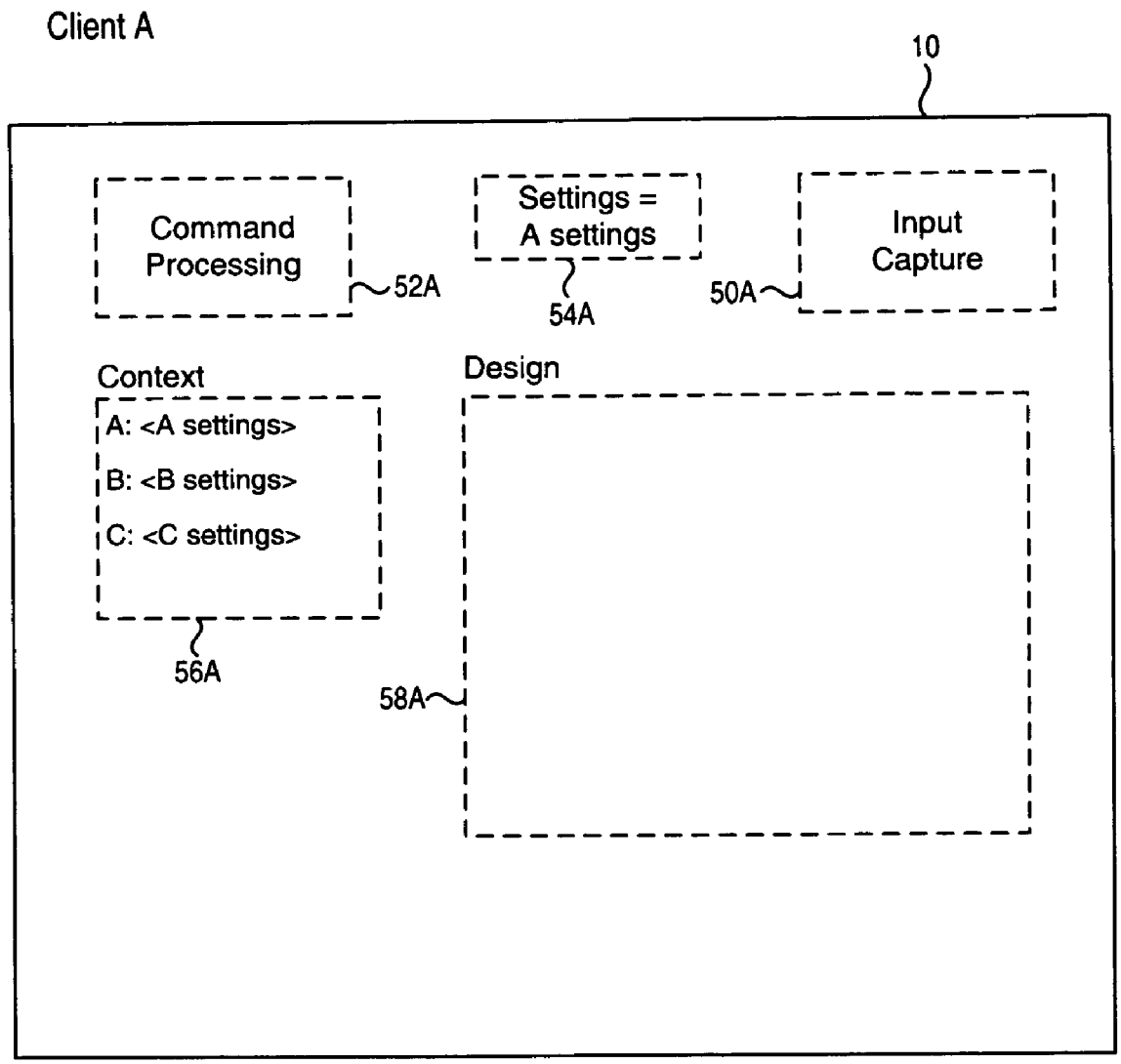
FIG. 2 is a block diagram of a client according to at least some embodiments.

FIG. 2 is a block diagram of client A from FIGS. 1A-1C. Client B is not shown, but is substantially similar. Omitted from FIG. 2 are display 11 and other details of computer 10 not needed for understanding the invention. FIG. 2 shows various software components of client A in broken lines. As used herein, "software component" refers to one or more data elements performing a particular function or group of functions. The element(s) (which are stored on a hard drive, RAM and/or other type of machine-readable medium) may include instructions (e.g., an executable program file) that cause processor(s) to perform certain actions, may store (or include stored) information (e.g., a database or a buffer), and/or may perform combinations of these and/or other functions.

One component shown in FIG. 2 is input capture component 50A. Component 50A detects input from user A and converts that input into appropriate commands. As described in more detail below, component 50A also determines whether those commands should be forwarded to the server, or whether those commands can be processed without forwarding to the server. Also shown in FIG. 2 is a command processing component 52A. Component 52A receives commands from the server and from input capture component 50A and performs the operation(s) called for by those commands. Client A further includes various data storage components. A design database 58A stores a local copy of a PCB design that is being edited at client A. A settings component 54A stores data representing parameter values that are applied when performing modifications to a locally stored PCB design. Those values (or settings), which might include things such as width of a trace, diameter of a via, etc., affect the manner in which one or more types of design changes are carried out. A context component 56A stores data corresponding to settings of other clients participating in the current editing session. As explained in more detail below, client A uses this context data for other clients when executing design change commands originating at other clients.

Figure 3:
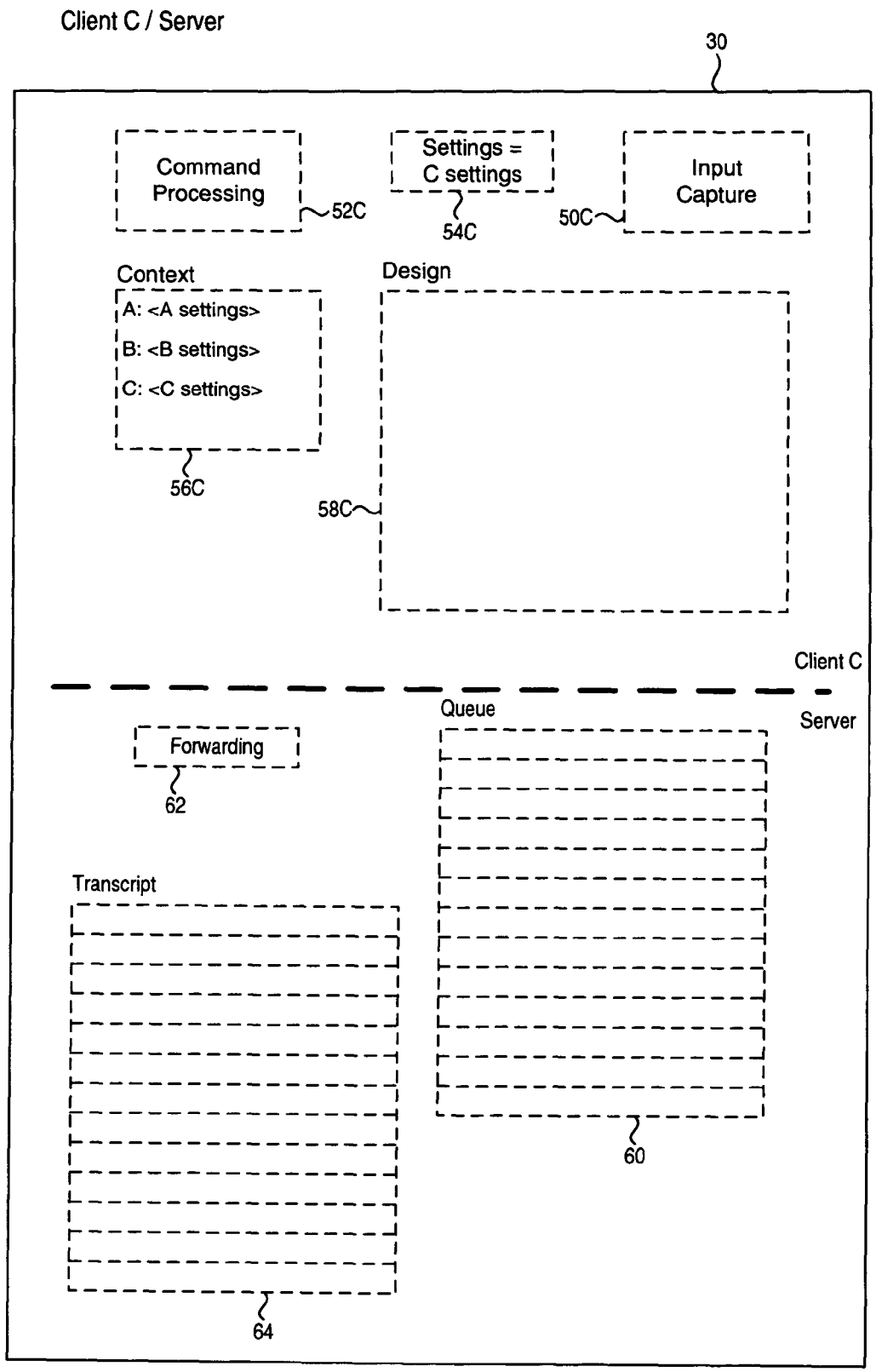
FIG. 3 is a block diagram of a client and server according to at least some embodiments.

FIG. 3 is a block diagram of client C and the server from FIGS. 1A-1C. In at least some embodiments, and as previously indicated, client C and the server simultaneously run as separate programs on a single computer (computer 30 in FIGS. 1A-1C). Client C is substantially similar to clients A and B. In particular, client C includes an input capture component 50C, a command processing component 52C, a settings component 54C, a context component 56C and a database component 58C. Software components of the server include a queue 60, a forwarding component 62 and a transcript storage component 64. As with the software components described for clients A-C, server software components are stored in a hard drive, RAM and/or other type of machine-readable medium, and may execute instructions, store information, and/or perform combinations of these and/or other functions. As previously indicated, client commands received by the server are placed in queue 60 in the order in which they are received. Forwarding component 62 retrieves commands from queue 60 and then forwards those commands to the clients in the same order. After forwarding a command to the clients, forwarding component 62 moves that command from queue 60 to transcript storage 64. Transcript storage 64 maintains a history of all commands and the order in which they were executed, and can be used to reconstruct the current state of the PCB design in the event that transmission errors, connectivity or other problems interrupt execution of one or more commands at a client. As explained in more detail below, transcript storage 64 is also used when a new client joins an editing session. In some embodiments, transcript storage 64 only retains commands for a limited amount of time (e.g., commands made in the previous 24 hours). In other embodiments, transcript storage 64 retains commands based on other criteria. For example, transcript storage 64 may be cleared after all clients except client C have logged off and client C has confirmed that all transmitted commands have been processed.

Although various software components are shown as separate blocks in FIGS. 2 and 3, this is only for purposes of simplifying description of certain embodiments. As will be appreciated by persons skilled in the art, there are numerous manners in which the functions performed by the described software components may be combined and/or distributed among multiple software elements.

Figure 4A:
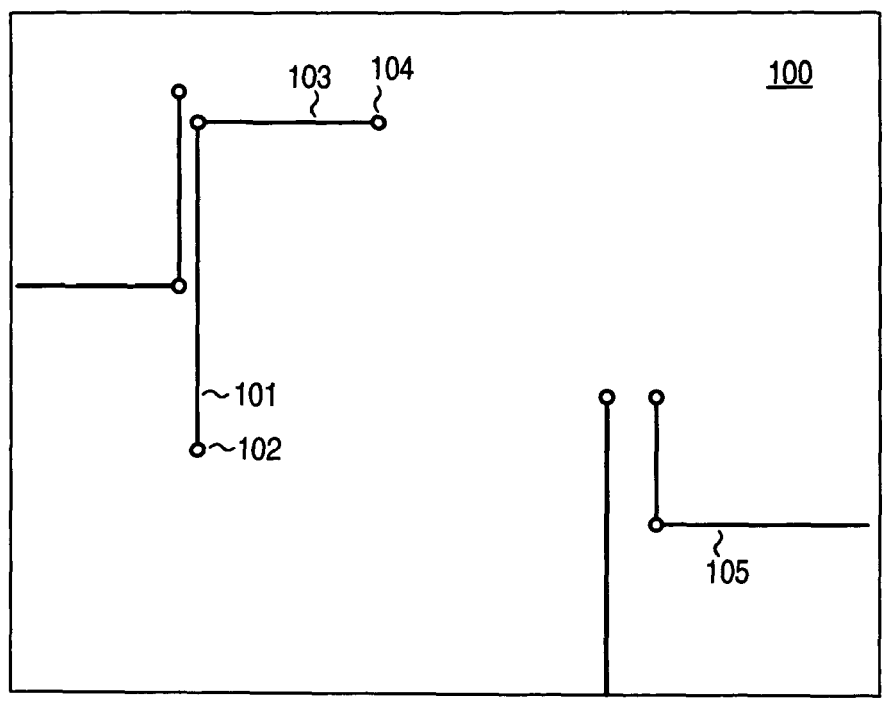
FIG. 4A is a portion of a PCB design used to explain operation of at least some embodiments.

FIG. 4A shows a portion of a PCB design 100 that will be used to further illustrate operation of at least some embodiments of the invention. For simplicity, FIG. 4A only shows two types of PCB design objects. In particular, PCB traces are shown as lines (e.g., traces 101, 103 and 105) and vias are shown as circles (e.g., vias 102 and 104). The traces may be on the same layer or on different layers. Traces on different layers may be distinguished by, e.g., use of different display colors. PCB design 100 could include numerous other objects that might be displayed to the user, as well as numerous objects that might not be displayed. For simplicity, however, and because many such objects would be treated in a similar fashion, the following examples are generally confined to traces and vias.

Figure 4B:
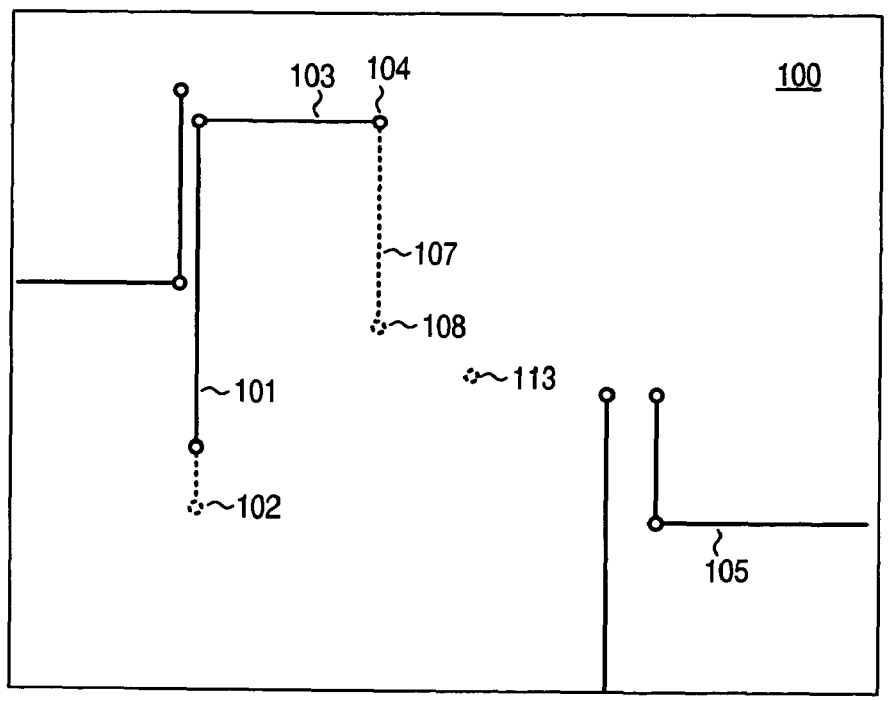
FIGS. 4B-4D are potential changes to the PCB design portion of FIG. 4A.
Figure 4C:
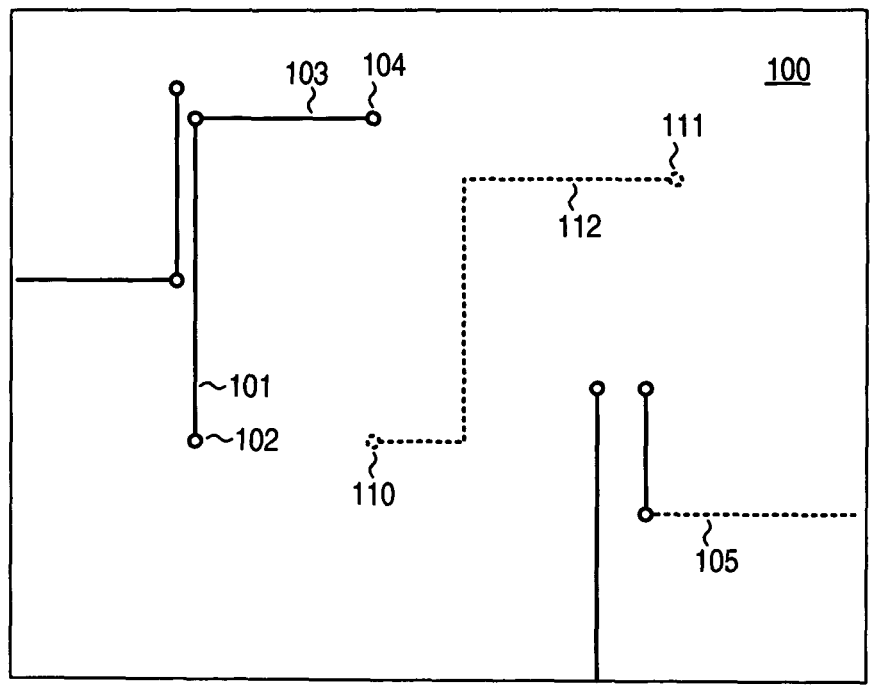
Figure 4D:
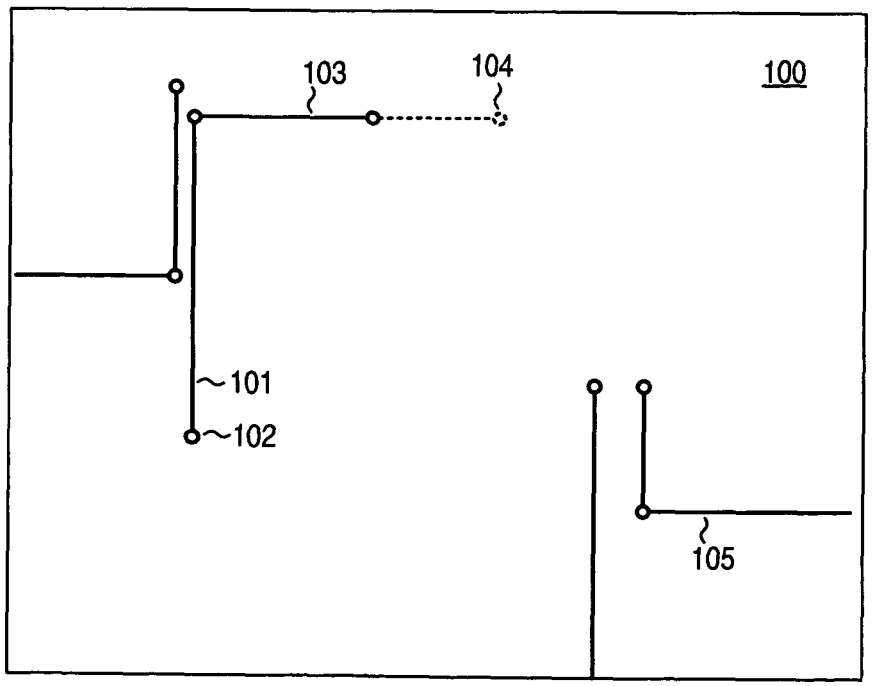

FIG. 4B shows a series of modifications that user A (i.e., the user at client A) wishes to make to PCB design 100. User A wishes to move via 102 and extend trace 101, as well as to add a new trace 107 (extending from via 104) and new vias 108 and 113. FIG. 4C shows a series of modifications that user B wishes to make to PCB design 100. User B wishes to delete trace 105, to add a new trace 112 and to add new vias 110 and 111. FIG. 4D shows a modification that user C wishes to make to PCB design 100. User C wishes to move via 104 and extend trace 103.

FIGS. 5A-5K illustrate the resulting changes to PCB design 100 when clients A, B and C submit commands to make the changes shown in FIGS. 4A-4C. Those commands, the times (and thus the order) in which they are transmitted to the server, and the reference numbers for those commands in FIGS. 5A-5K are shown in Table 1.

TABLE 1

| Trans. Time | Client | Command | Ref. |
| --- | --- | --- | --- |
| t1 | A | <select via 102, trace 101> | 120 |
| t2 | A | <move via 102, extend trace 101> | 121 |

TABLE 1-continued

| Trans. Time | Client | Command | Ref. |
| --- | --- | --- | --- |
| t3 | A | <add via 108> | 122 |
| t4 | A | <select via 108> | 123 |
| t5 | C | <select via 104, trace 103> | 124 |
| t6 | A | <add trace 107 between vias 108 and 104> | 125 |
| t7 | B | <change setting> | 126 |
| t8 | B | <select trace 105> | 127 |
| t9 | B | <delete trace 105> | 128 |
| t10 | C | <move via 104, extend trace 103> | 129 |
| t11 | B | <add via 110> | 130 |
| t12 | B | <add via 111> | 131 |
| t13 | B | <select via 110> | 132 |
| t14 | A | <add via 113> | 133 |
| t15 | B | <add trace 112> | 134 |

In Table 1, commands 120-134 are shown generically as descriptions of the desired actions placed between angled brackets. For example, a command to add an object is shown as "<add . . . >." Similarly, commands to move or delete an object are shown as "<move . . . >" and "<delete . . . >," respectively. A "<select . . . >" command corresponds to selection of a design object by a user in preparation of performing some action on that object.

Each command in Table 1 is generated by the input capture component at the client from which the desired change is being initiated. For example, user A could indicate a desire to move via 102 by placing a mouse-controlled cursor over the via, by pressing a mouse button, by moving the cursor to the desired location for the via, and then releasing the mouse button. When user A initially presses the mouse button after moving the cursor over via 102, input capture component 50A generates a command to indicate that user A has selected via 102. As explained in more detail below, this reserves via 102 for modification by user A and prevents other users from modifying via 102 while it is under the control of user A. Because trace 101 is connected to via 102, selecting via 102 automatically selects trace 101. When user A then releases the mouse button after having moved via 102 to a different location, input capture component 50A generates commands to move via 102 and to extend trace 101 to the new location of via 102. In at least some embodiments, a separate "release" command is not always generated. Instead, the command processor at each client is configured to automatically release an object upon certain events (e.g., completion of certain modifications, adding an object). In some embodiments, a user can explicitly indicate a wish to release an object the user previously selected (e.g., by highlighting an object and selecting "release" from a context menu). In such a case, the input capture component generates a command (e.g., "<release . . . >") and transmits that command to the server, with the server then forwarding that command to all clients.

In some embodiments, and as also shown in Table 1, certain related commands may be concatenated or otherwise combined into a single command before those commands are transmitted to the server. For example, trace 101 is automatically selected when via 102 is selected, and it is thus convenient to combine those operations into command 120. As another example, a user moving via 102 would probably want to extend trace 101 connected to that via. Accordingly, it is also convenient to combine those operations into command 121. Of course, commands can also be bundled on other bases. As but one additional example, commands can be bundled based on those commands pertaining to a particular region of a design (e.g., an area of a predetermined size). In some cases, a user may specifically provide input indicating that a particular set of commands should be grouped and sent to the server at one time. Commands could also be grouped based on time (e.g., group all commands corresponding to user input within a predetermined time period). In other embodiments, some or all of these commands shown in Table 1 might not be combined. In some such embodiments, for example, selection or movement of a via would not automatically cause selection or movement of an attached trace (e.g., the user could indicate whether traces should be locked to or associated with vias or other objects and the locked objects moved together).

Figure 5A:
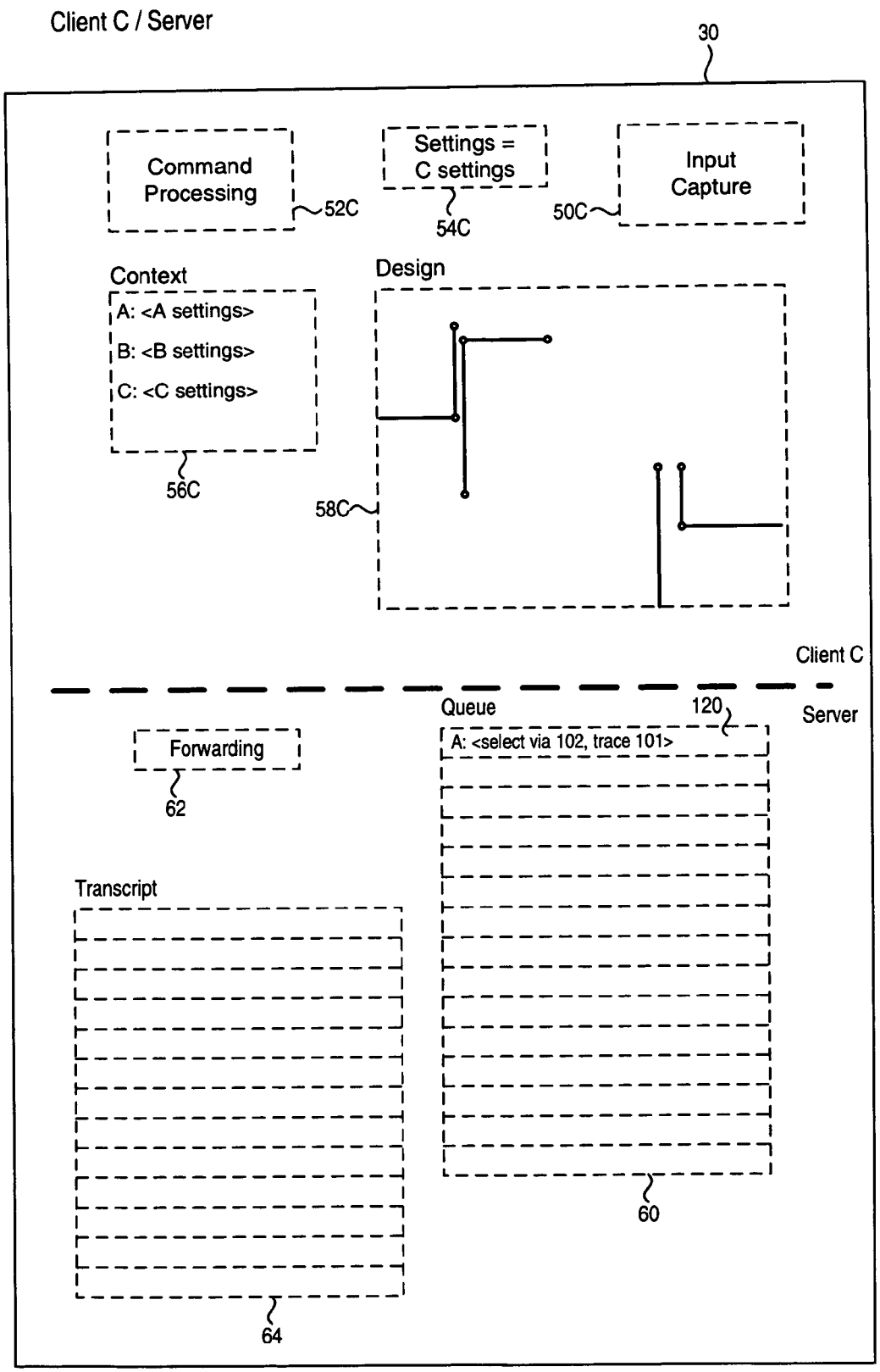
FIGS. 5A-5K show changes to a PCB design at several clients according to at least some embodiments.

FIG. 5A shows the server between times t1 and t2 of Table 1. Command 120 is in queue 60 of the server. As also seen in FIG. 5A, command 120 includes data indicating the client from which the command originated. This data, which may be added at either the originating client (client A in this case) or by the server, could be a code number assigned to the originating client, a user name, or other type of identifier. In FIGS. 5A-5K and 6, the originating client identifier for each command is shown with a letter at the beginning of a command.

Figure 5B:
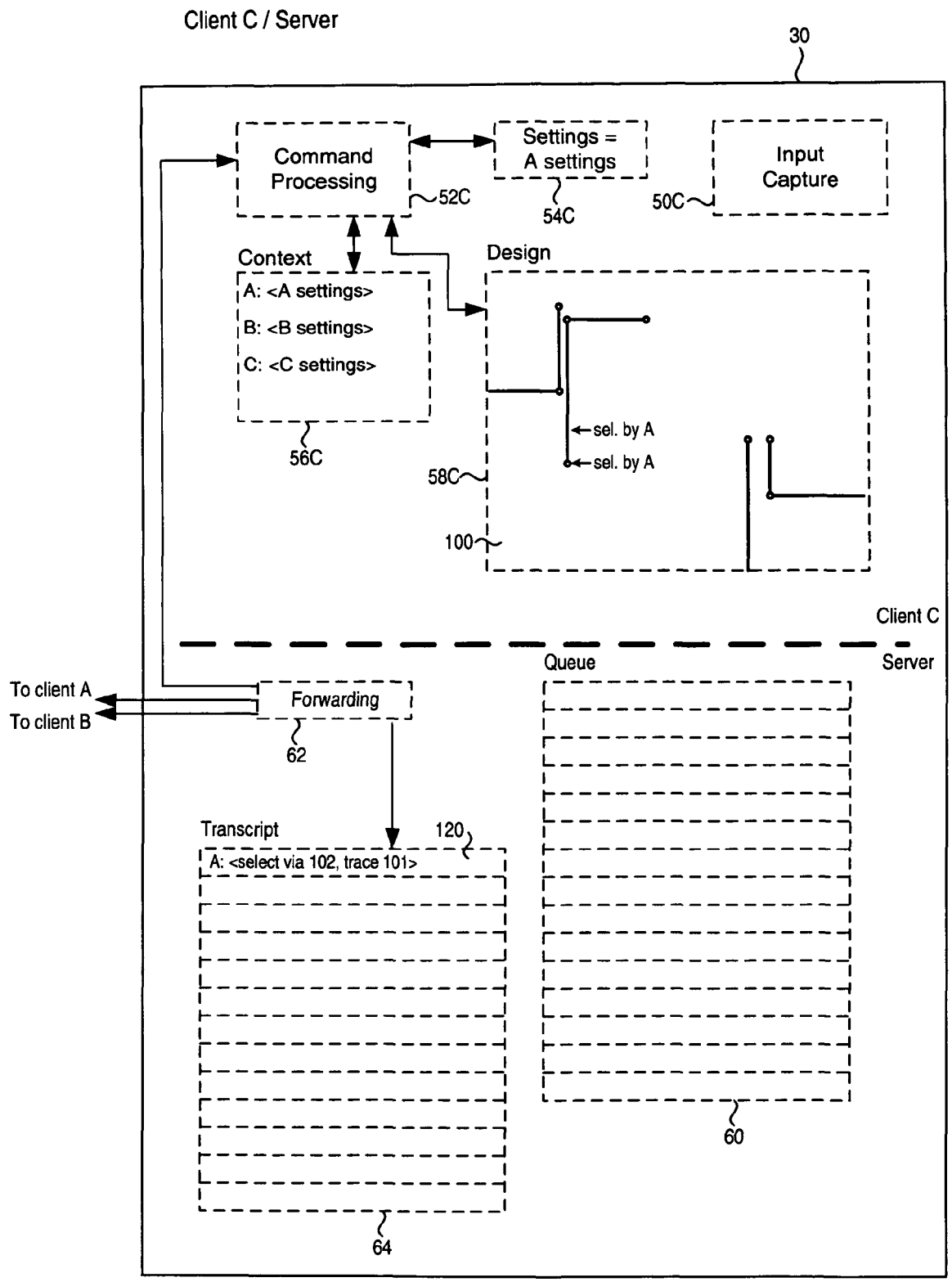

Forwarding component 62 operates by taking command 120 from the top of queue 60, by forwarding command 120 to the clients, and by moving the forwarded command from queue 60 to transcript storage 64. If there were more commands in queue 60, forwarding component 62 would proceed to the next command in queue 60 and repeat these steps. In FIG. 5B, forwarding component 62 has retrieved command 120 ("A:<select via 102, trace 101>") from queue 60, forwarded command 120 to clients A-C, and moved command 120 to transcript storage 64. Upon receipt of the command, and as also shown in FIG. 5B for client C, the command processing component of each client performs several actions. First, the command processing component identifies the client from which the just-received command originated. The command processing component then retrieves the settings for the originating client from the context component and applies the retrieved settings to the executing client. In FIG. 5B, for example, command processing component 52C detects that command 120 originated from client A. Accordingly, the client A settings are retrieved from context component 56A and the settings of client C are reset to match those of client A. This is performed so that the local copy of PCB design 100 at each client (client C in the case of FIG. 5B) will be changed in exactly the same way as the copy at the client that initiated the command. In some embodiments, client settings are changed before execution of any commands received from the server. In other embodiments, settings are not changed for commands in which execution will not be affected by any particular setting.

As described in more detail below, the command processing component next determines whether execution of the received command will require operation(s) upon one or more objects that have been selected by (and thus reserved for) other users. As also discussed below, the command processing component also determines whether executing the received command will result in an invalid action (i.e., cause objects to conflict or otherwise result in an error). Assuming the answer to both inquiries is no, the command processing component executes the received command and applies any resulting changes to the local copy of PCB design 100 in the database component.

In FIG. 5B, command processing component 52C executes command 120 by modifying data objects for via 102 and trace 101 so as to indicate those objects have been selected by client A. An object may be marked as "selected" in any of various ways. In some embodiments, each selectable design object has a flag that indicates whether or not that object is selected, as well as a field for storing an identifier of a client (or user) that may have selected the object. When an object is selected, the flag is set to a "selected" state, and the selecting client's identifier is stored in the object. An object is deselected (or released) by setting the flag to an "unselected" state. Further details of object selection are provided below.

Upon execution of the received command, the command processing component in each client changes the settings back to those of that client. For example, command processing component 52C would change the settings of client C back to "<C settings>" once a command originating from another client has been executed.

After command 120 is received from the server and processed by client A (not shown), user A is then able to make more changes to design 100. After a client sends a design-changing command to the server in at least some embodiments, the client will not accept certain types of user input until the pending command is received back from the server and processed by the client. Otherwise, and because the design changes corresponding to the pending command have not yet been made to the client's local copy of the design, the user might be attempting to make design changes without knowing the true state of the design.

Figure 5C:
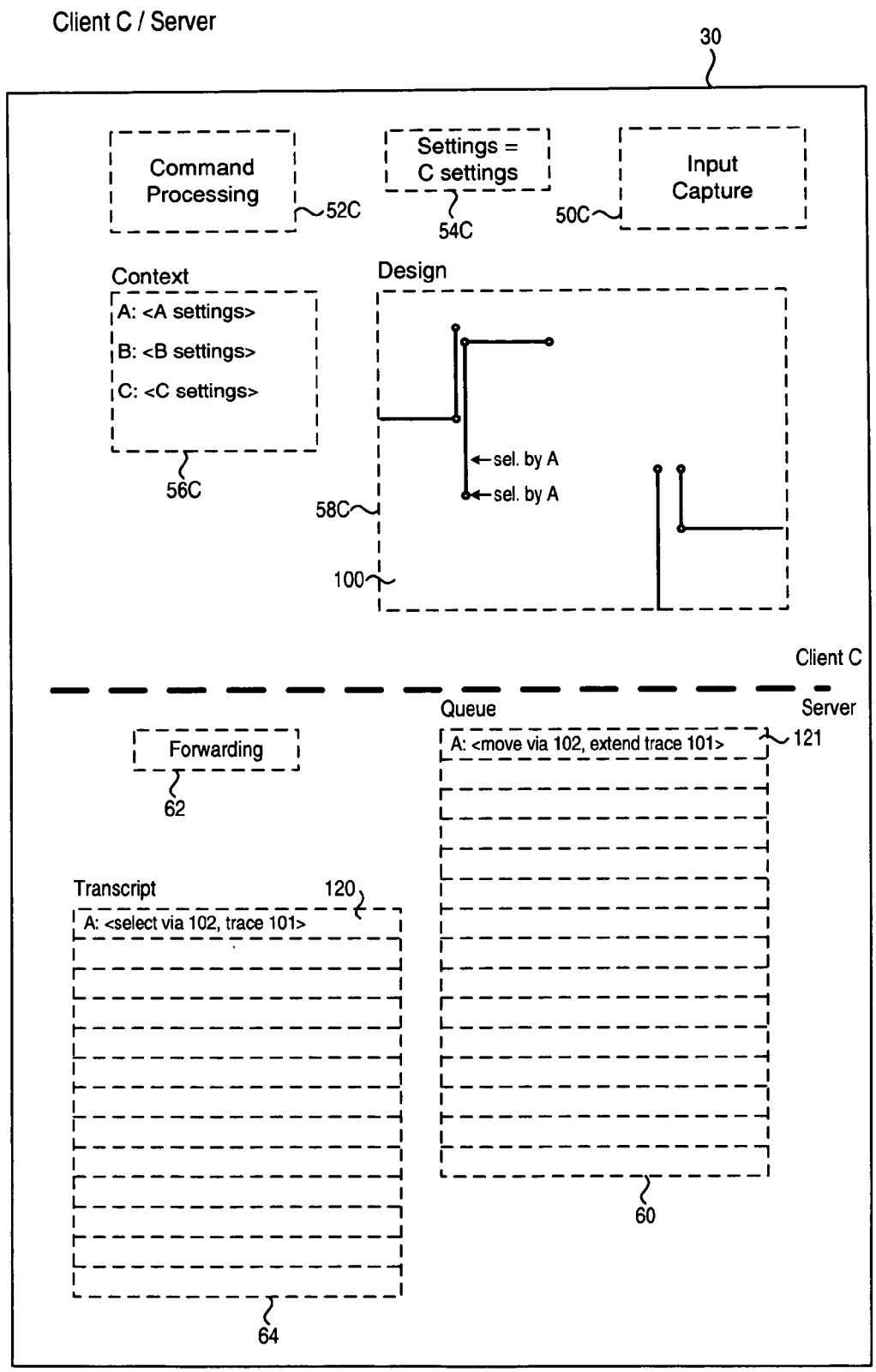

In the present example, user A provides input corresponding to command 121 (time t2 in Table 1) after command 120 has been received from the server and processed by client A. Client A thus accepts that input, generates command 121, and forwards command 121 to the server. FIG. 5C shows the server after receipt of command 121 into queue 60 ("A:<move via 102, extend trace 101>"), and prior to retrieval of command 121 by forwarding component 62.

Figure 5D:
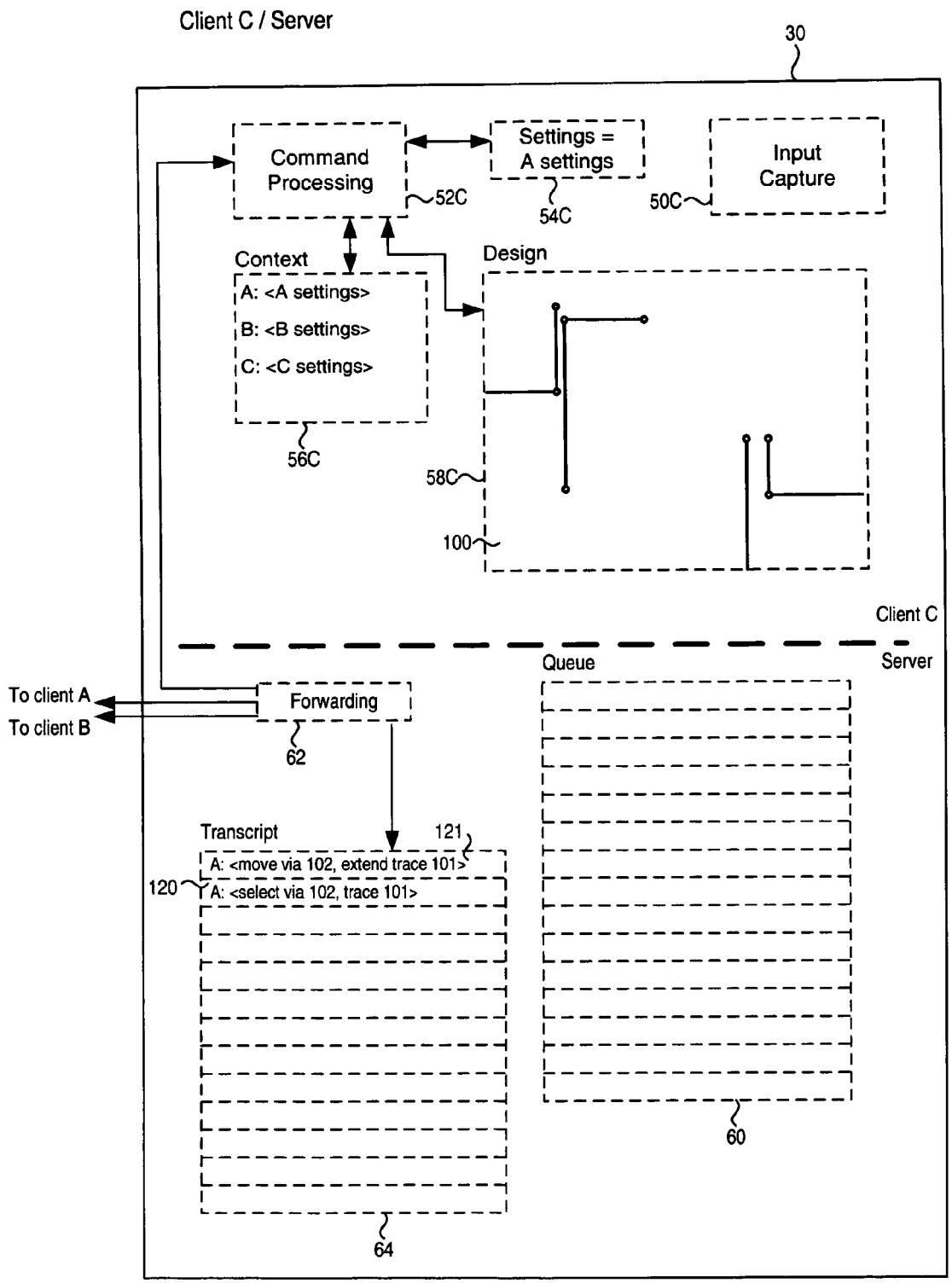

In FIG. 5D forwarding component 62 has retrieved command 121 from queue 60, forwarded command 121 to the clients, and moved command 121 to transcript storage 64. Upon receiving command 121, each client again performs steps similar to those performed in connection with command 120. Although FIG. 5D shows the server forwarding command 121 after command 120 has been processed by client C, this need not be the case. In other words, the server may forward one or more commands in queue 60 without waiting for previously-forwarded commands to be processed by a client. Indeed, the server may be unaware of whether one or more clients have processed a previously-forwarded command. Instead, each client also may have an input queue (not shown) in which commands from the server are stored pending processing of any commands previously received from the server. In this manner, each client processes commands from the server in the order in which they were received from the server.

Figure 5E:
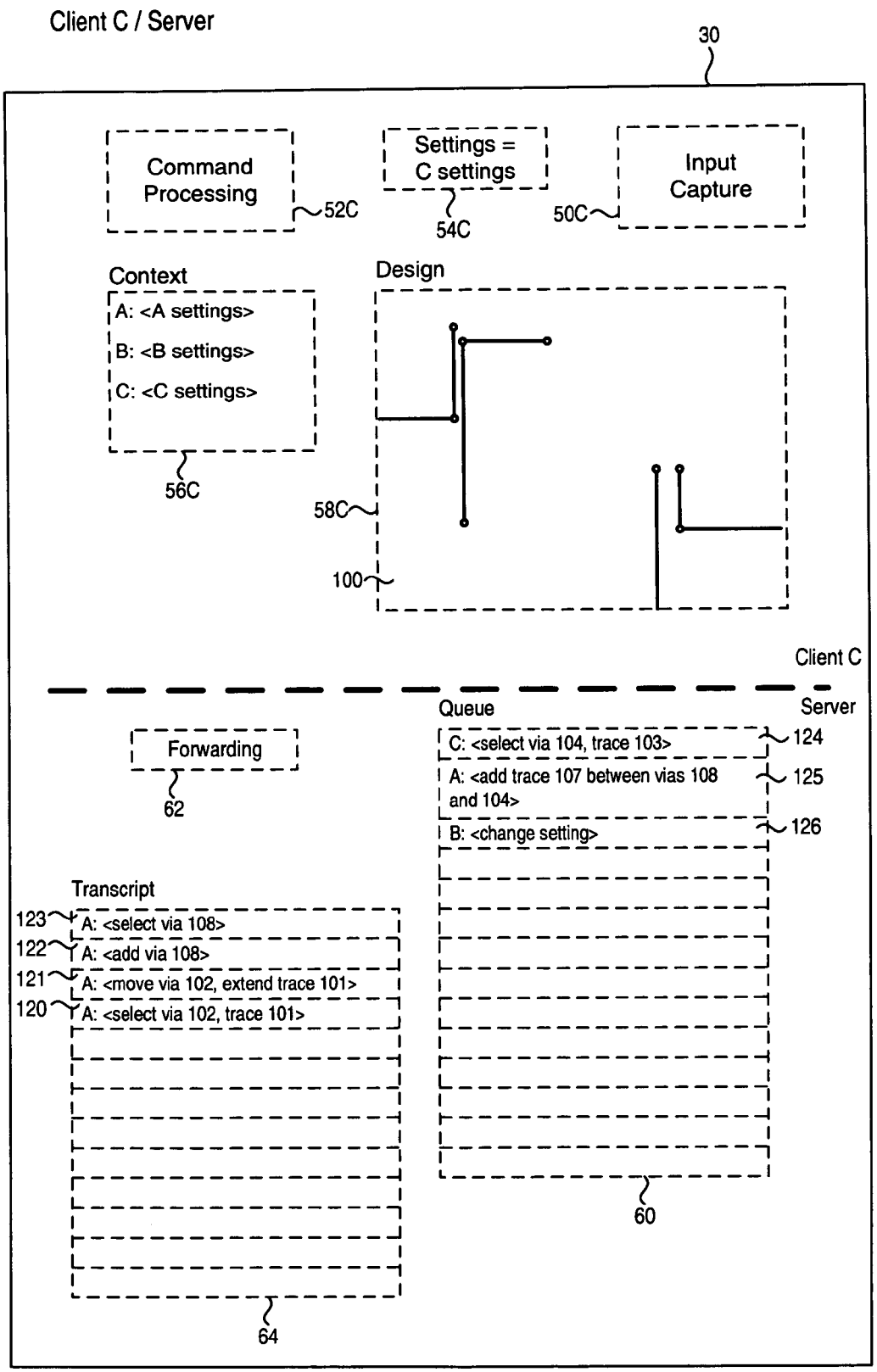

FIG. 5E shows the server at a subsequent time. The server has by now received and forwarded commands 122 and 123. As a result of commands 122 and 123, via 108 has been added (and then selected) by user A. As also shown in FIG. 5E, the server has just received commands 124, 125 and 126. In this example, it is assumed that transmission times t4-t6 of commands 124-126 (see Table 1) are contained within a relatively brief time period, and that all commands 124-126 are queued at the server prior to forwarding any of those commands to clients A through C. The purpose of these assumptions is to illustrate, e.g., operation of at least some embodiments when there are potentially conflicting commands from different clients. In practice, however, these commands may not simultaneously be present in the server queue 60. In particular, commands of the type in Table 1 would generally require minimal time to generate at a client, transmit to the server, forward from the server, and/or execute at a client. Unless there is near-simultaneous action by all three users (and/or other unusual circumstances), it is likely that command 124 would be forwarded to (and perhaps executed by) the clients before receipt at the server of command 125 and/or command 126. Absent transmission delays and certain computationally-intensive commands (e.g., an area fill operation in a large design), most users should perceive commands as being processed (e.g., executed to successful completion or rejected) in real time or in substantially real time.

Figure 5F:
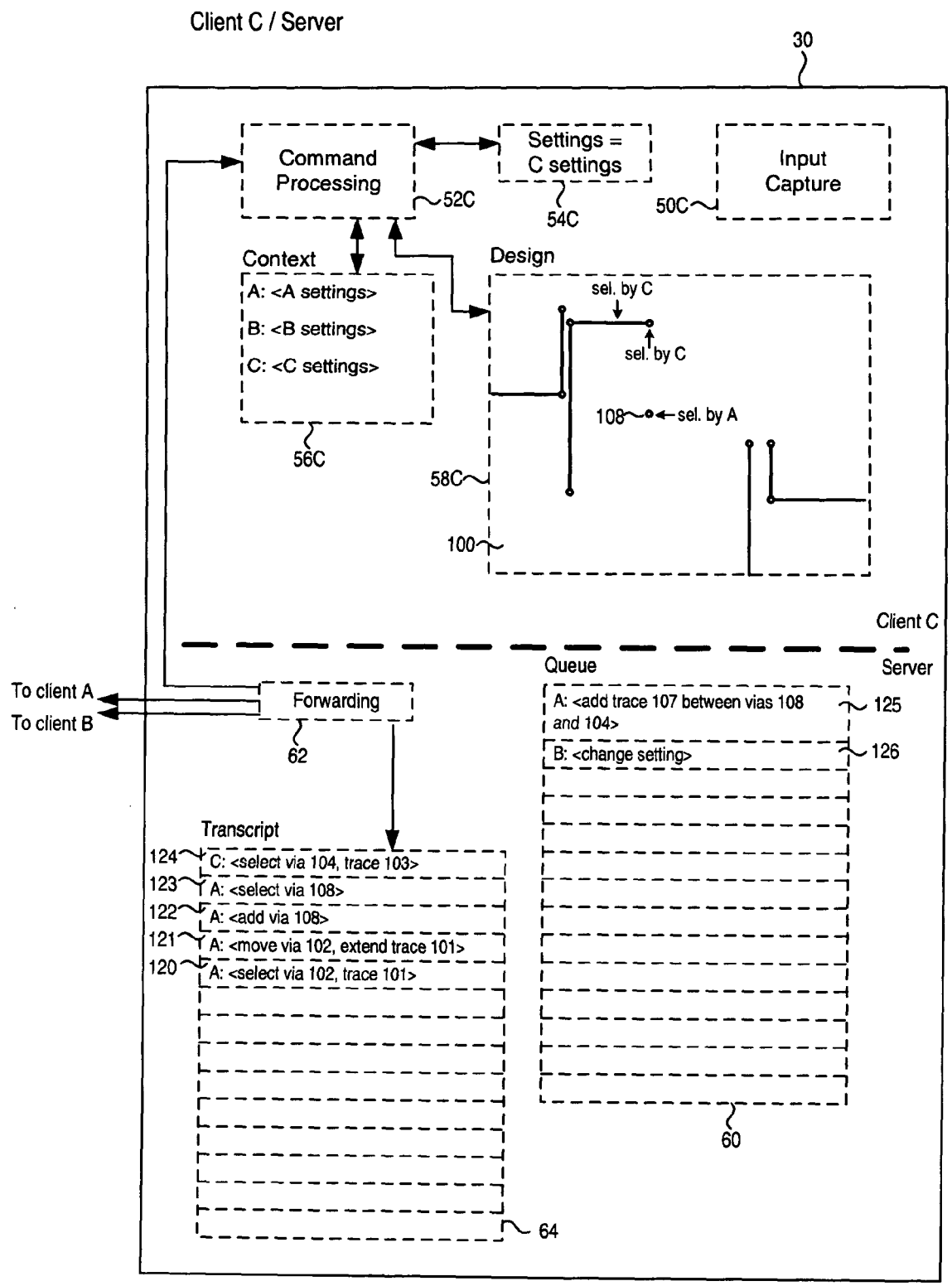

FIG. 5F shows the server just after command 124 has been retrieved from queue 60 by forwarding component 62. Command 124 has been transmitted to the clients and then moved to transcript storage 64. As a result of command 124, and as shown for client C, via 104 and trace 103 have been selected by user C.

Figure 5G:
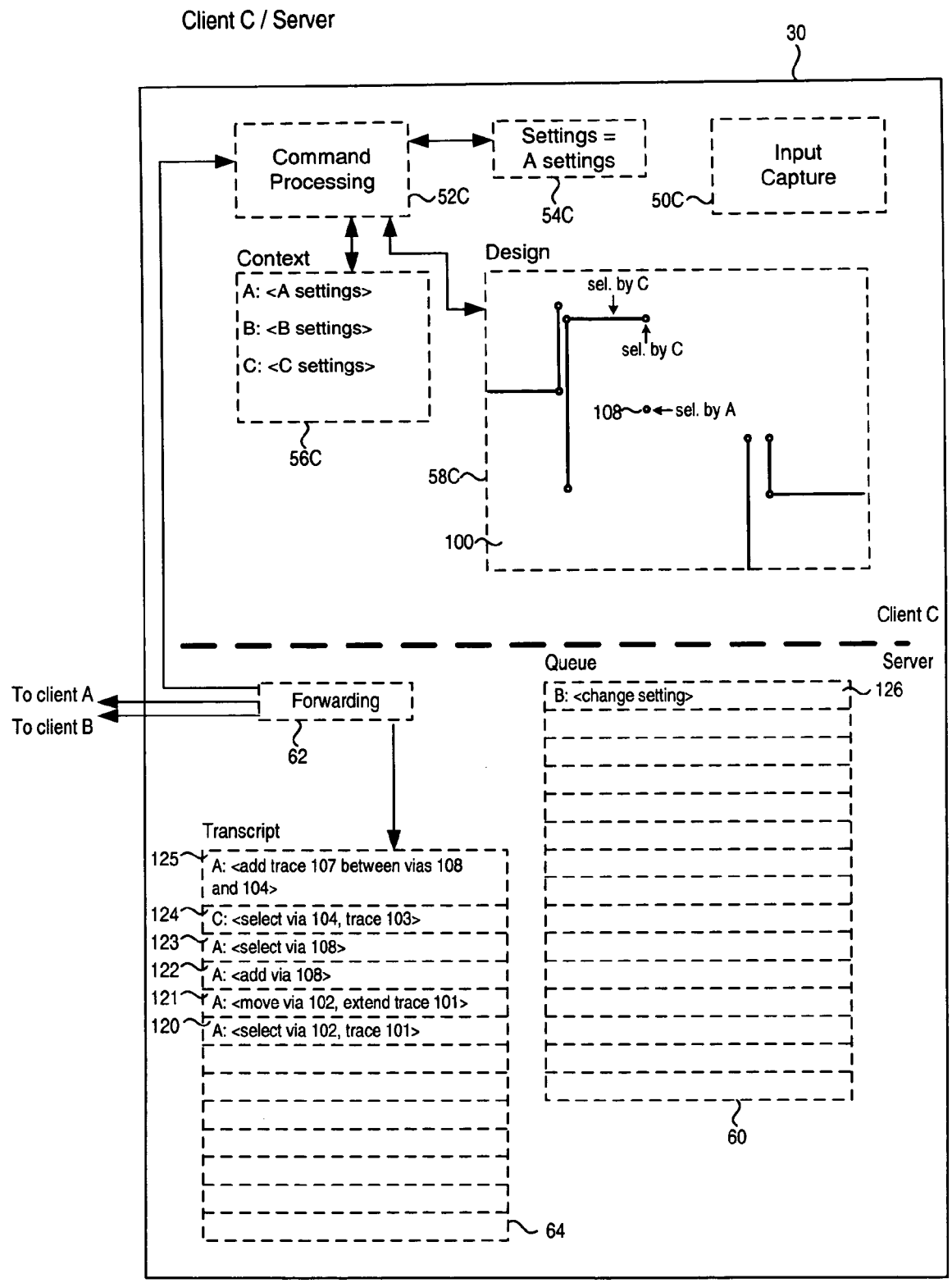

In FIG. 5G, forwarding component 62 retrieves command 125 from queue 60, forwards command 125 to the clients, and then moves command 125 to transcript storage 64. In the present example, command 125 was generated in response to an attempt by user A, after selecting via 108 as a starting point, to add trace 107 between vias 108 and 104. Because via 104 has previously been selected by user C, however, command 125 is not executed. When processing command 125, the command processor of each client detects that the selected/unselected flag for via object 104 is in the "selected" state. Each command processor then compares the identifier for the previously-selecting client (contained in via object 104) with the client identifier in command 125 (indicating the source of command 125). The two identifiers do not match, and each command processor thus rejects command 125 and does not perform the edit operations in that command.

Figure 5H:
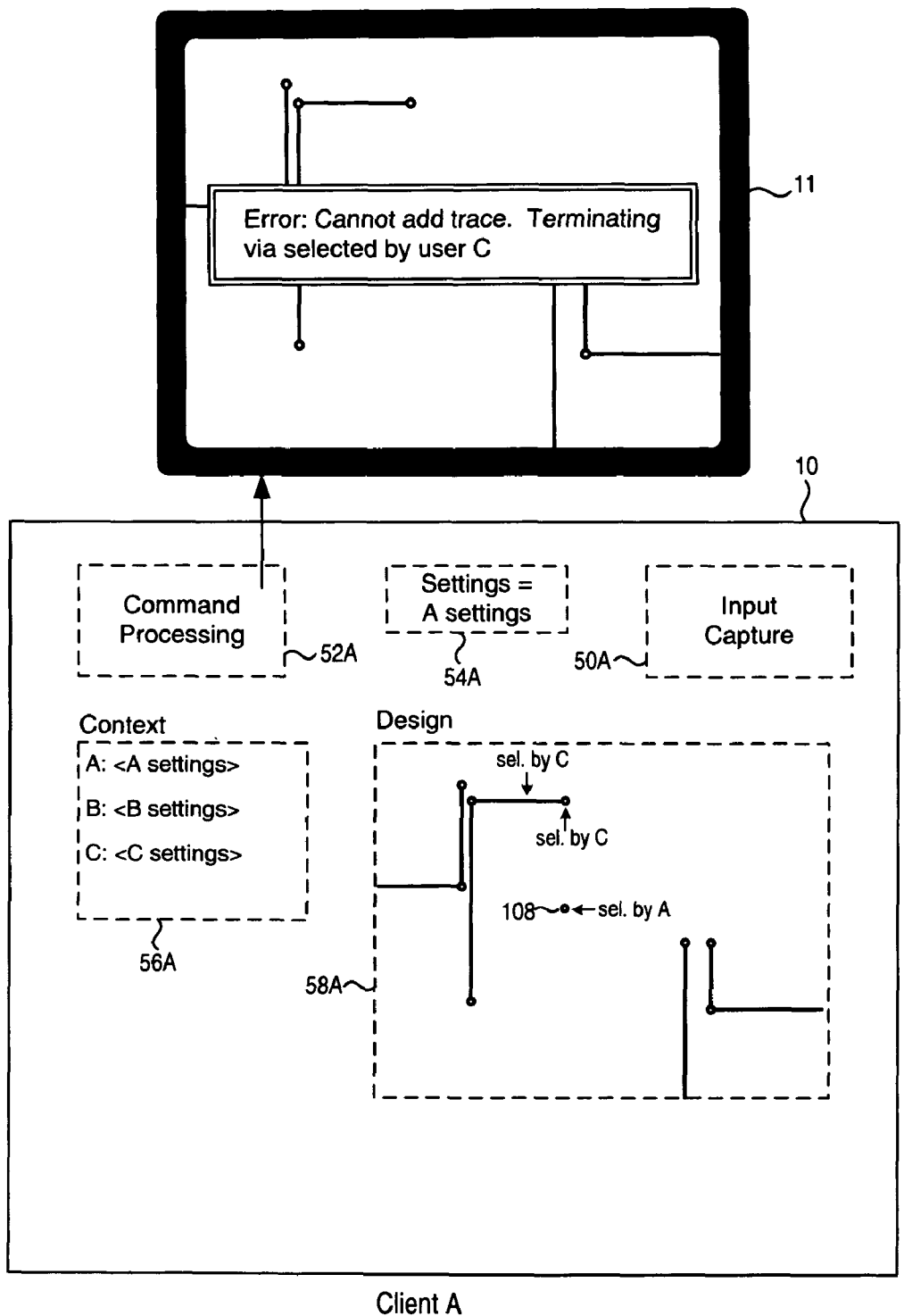

Because command 125 was not originated by user B or user C, neither of those users is expecting PCB design 100 to be edited in the manner sought by command 125. Accordingly, it is generally not necessary to advise user B or user C that command 125 has been rejected. User A, however, is expecting the edit corresponding to command 125. Accordingly, user A is advised of the command rejection. In some embodiments, and as shown in FIG. 5H, display 11 of client A is updated and provides a message dialog informing user A that the command cannot be executed.

Figure 5I:
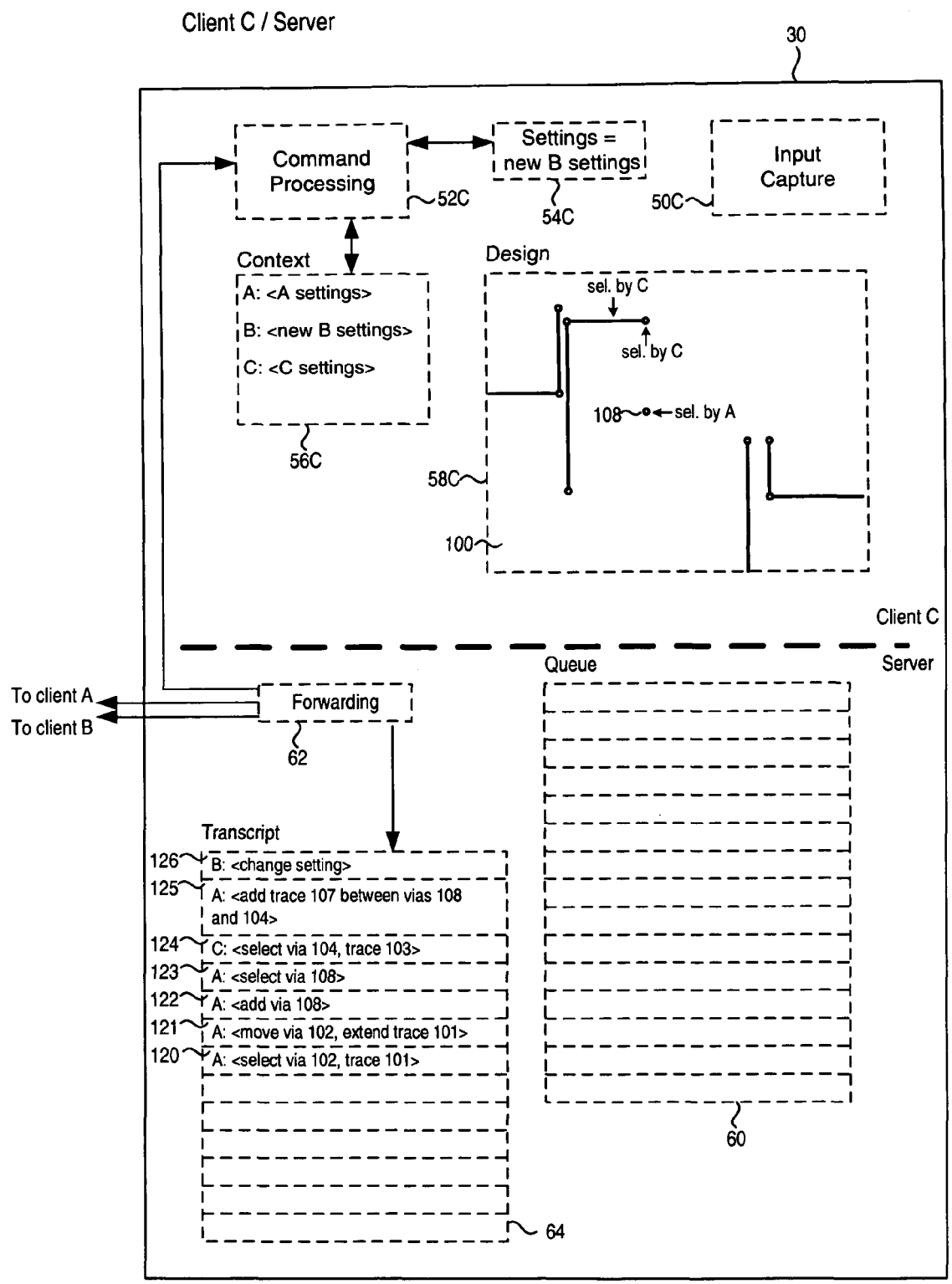

FIG. 5I shows the server and client C after forwarding of command 126. In the present example, command 126 was generated at client B in response to input by user B changing one of the settings of client B. By way of illustration, user B may have changed a setting that controls the width of traces added by user B. Although this change-of-settings command does not in and of itself require change to the copies of PCB design 100 stored at the various clients, it is sent to the server for forwarding to all clients. In this manner, subsequent changes to PCB design 100 initiated by user B (which changes are based on the new client B settings) are performed identically at all clients. If, for example, user B changed a trace width setting and then quickly added a new trace, the command to add the new trace (based on the changed setting) would be transmitted to the server after the command to change the trace width setting. Client B would not execute either command until it was received back from the server. Upon receipt of command 126 at each client, and as seen for client C in FIG. 5I, command 126 is executed by adjusting the client B settings (in settings component 56C) to reflect the new client B settings.

Figure 5J:
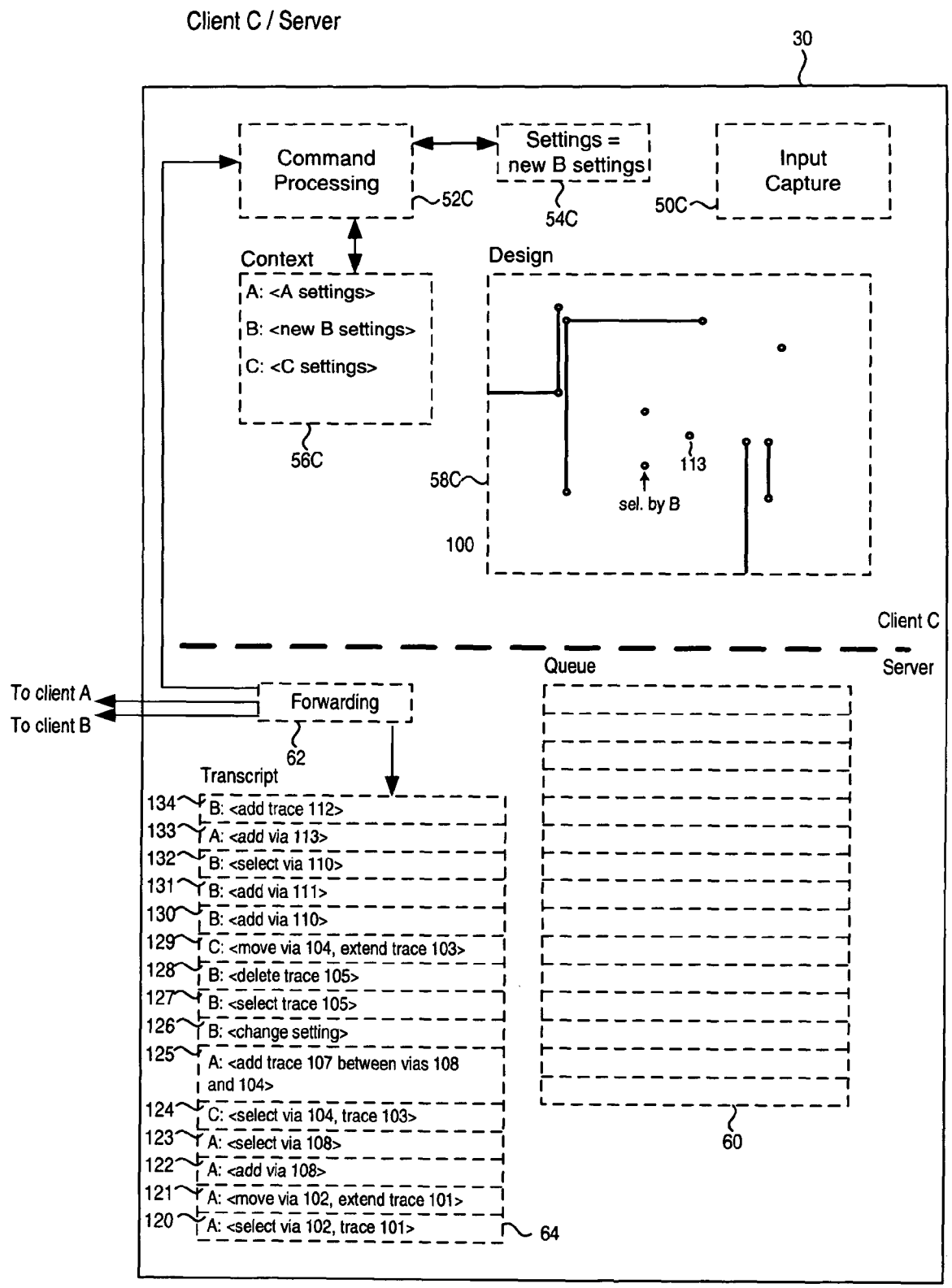
Figure 5K:
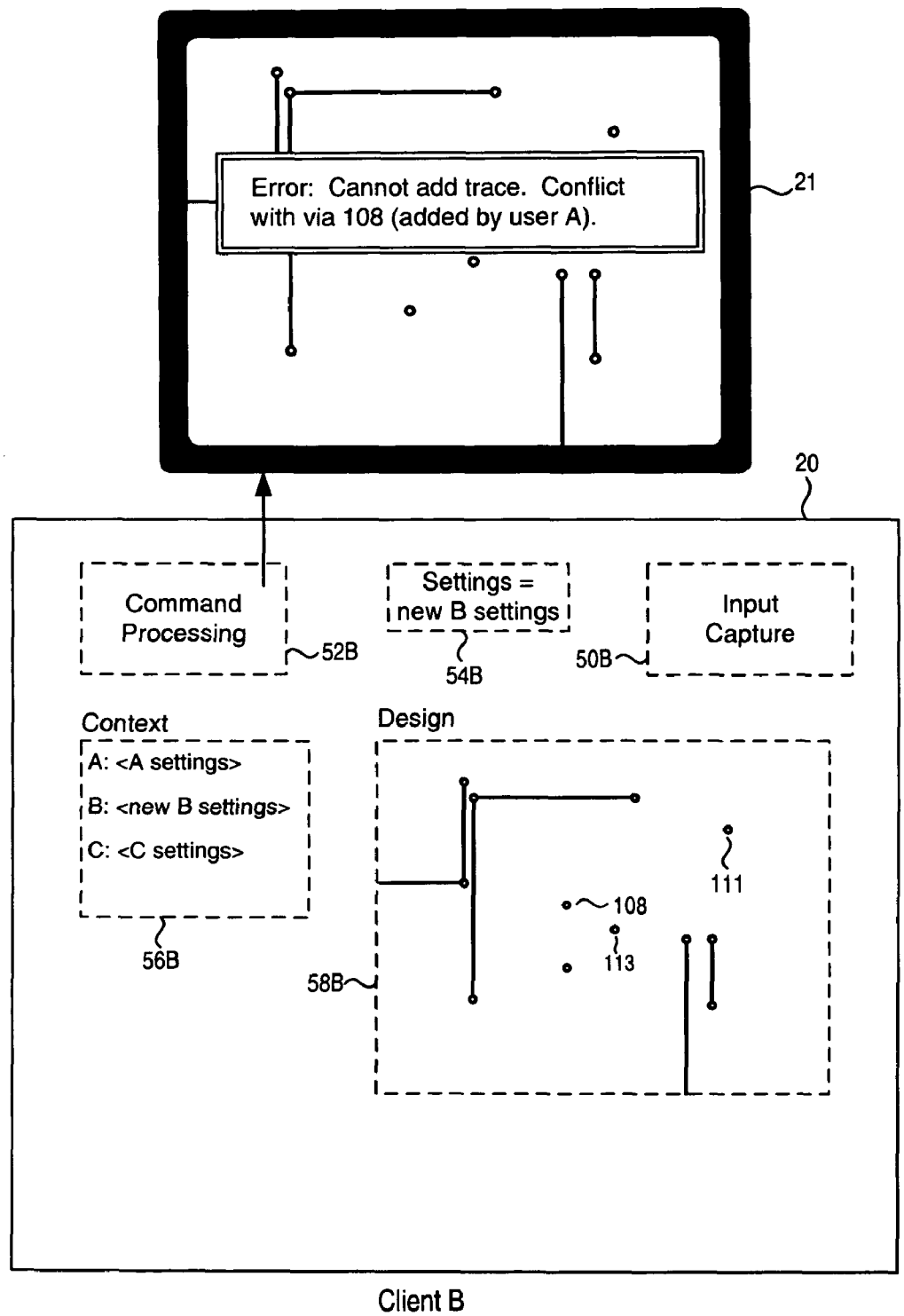

FIG. 5J shows the server at a subsequent time. Commands 127-133 have since been received in queue 60, forwarded to the clients, and moved to transcript storage 64. Commands 127-133 have also been processed by all clients. Because none of these commands were conflicting or otherwise invalid, all of the edits in commands 127-133 have been performed (at each client) on design 100. Forwarding component 62 has just forwarded command 134 to the clients. FIG. 5K shows client B after receipt of command 134. Components 50B, 52B, 54B, 56B and 58B in client B are similar to components 50A, 52A, 54A, 56A and 58A, respectively of FIG. 2. In FIG. 5K, client B is processing command 134. In the present example, command 134 was generated by client B in response to user B input seeking to add trace 112 between vias 110 and 111. When user B provided this input, however, user B was unaware that user A was seeking to add via 113. Moreover, via 113 lies along the path of trace 112. Depending upon the purpose of via 113, that via may conflict with trace 112. Accordingly, and as shown in FIG. 5K, command 134 is not executed. Instead, user B is provided with a message dialog indicating a conflict with an object previously added by another user. As with user A and command 125, only client B is expecting the edit of command 134. Accordingly, the dialog of FIG. 5K may not be shown at clients A or C. Upon seeing that command 134 was rejected, user B may attempt to relocate trace 112 so as to avoid via 113 (or vice versa). If via 113 does not actually conflict with trace 112 (e.g., via 113 and trace 112 are part of the same net in a circuit being placed onto a PCB), user B might alternately seek to add a trace between vias 110 and 113 and another trace between vias 113 and 111.

Figure 6:
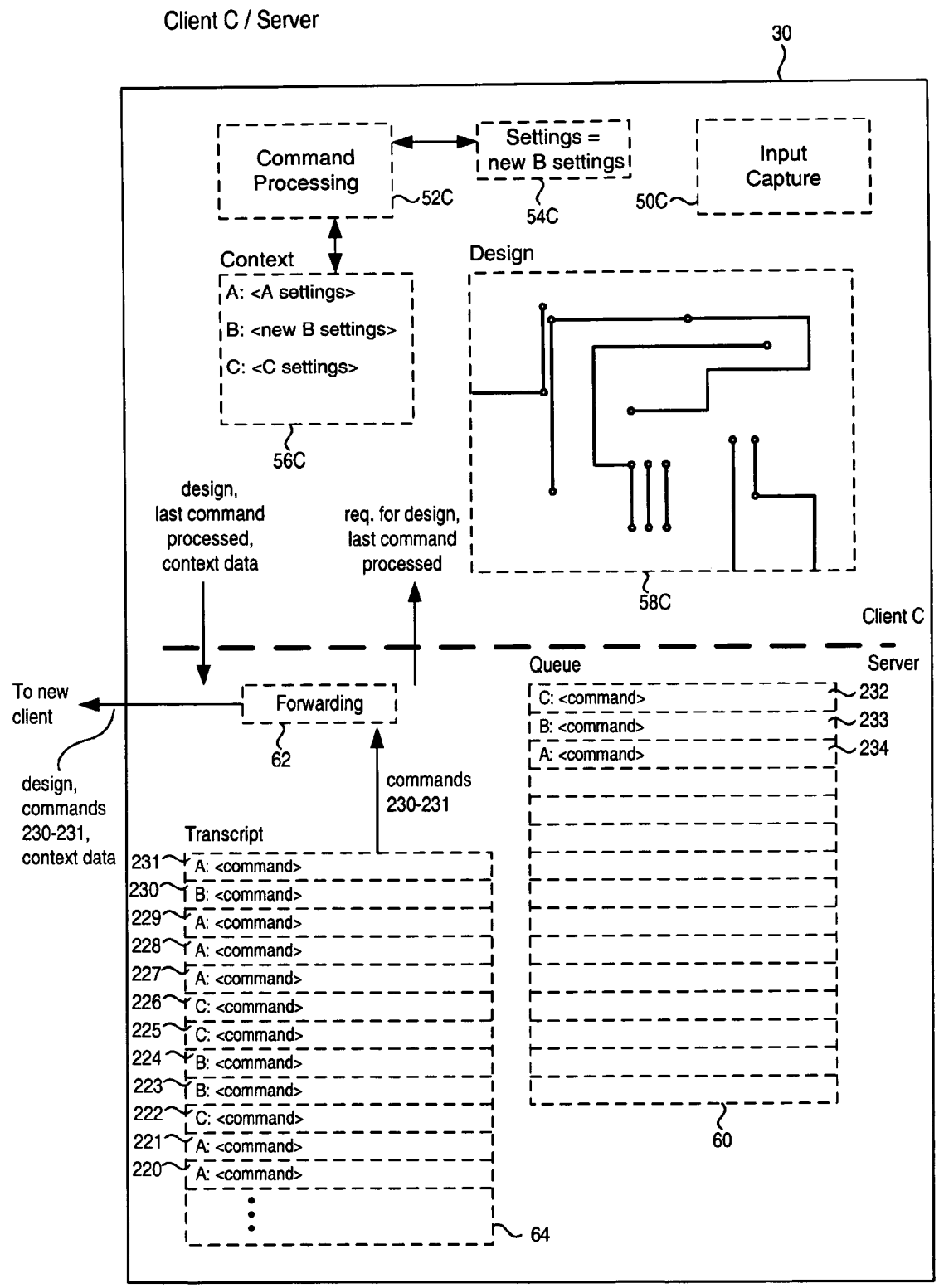
FIG. 6 shows, according to at least some embodiments, addition of a new client to an editing session.

FIG. 6 shows, according to at least some embodiments, addition of a new client to an ongoing editing session. FIG. 6 shows the server and client C at a time subsequent to that of FIG. 5K. Numerous other commands have since been queued and forwarded (e.g., commands 220-231), and additional commands await forwarding in queue 60 (commands 232-234). In FIG. 6, another client (not shown) has transmitted a message to the server requesting inclusion in the current editing session. In response, the server temporarily stops processing commands in queue 60. The server then requests data from client C. In some embodiments, the copy of PCB design 100 stored at client C effectively serves as the master database for that PCB design. When a new client joins a design session, the current state of the PCB design is provided to the new client by copying the design from client C. Accordingly, the server requests that server C provide the current version of the PCB design stored in design database 58C and a copy of all client settings from context component 56C. The server also requests that client C indicate the last command that was processed by client C. Client C then provides the requested data to the server. If the last command processed by client C is the last command moved to transcript storage 64 (command 231 in FIG. 6), then the PCB design copy from client C includes all changes that will be made as a result of the commands that have been transmitted to the clients. In such a case, the server simply provides the newly-joining client with a copy of the PCB design and the context data obtained from client C. The server then resumes processing of commands in queue 60, which processing will now include forwarding queued commands to the new client.

If the last command processed by client C was not the last command moved to transcript storage 64, the PCB design copy from client C may not include all changes that will be made as a result of all the commands that have been transmitted to the clients. In such a case, the server also provides the new client with the same commands previously provided to (but not yet processed by) client C. In the example of FIG. 6, client C indicates that the last command it processed was command 229. Accordingly, the server sends the new client the PCB design copy and the context data from client C, plus all commands placed in transcript storage 64 subsequent to command 229 (commands 230-231 in the example of FIG. 6).

The server then resumes processing of commands in queue 60, which processing will now include forwarding queued commands to the new client.

Figure 7:
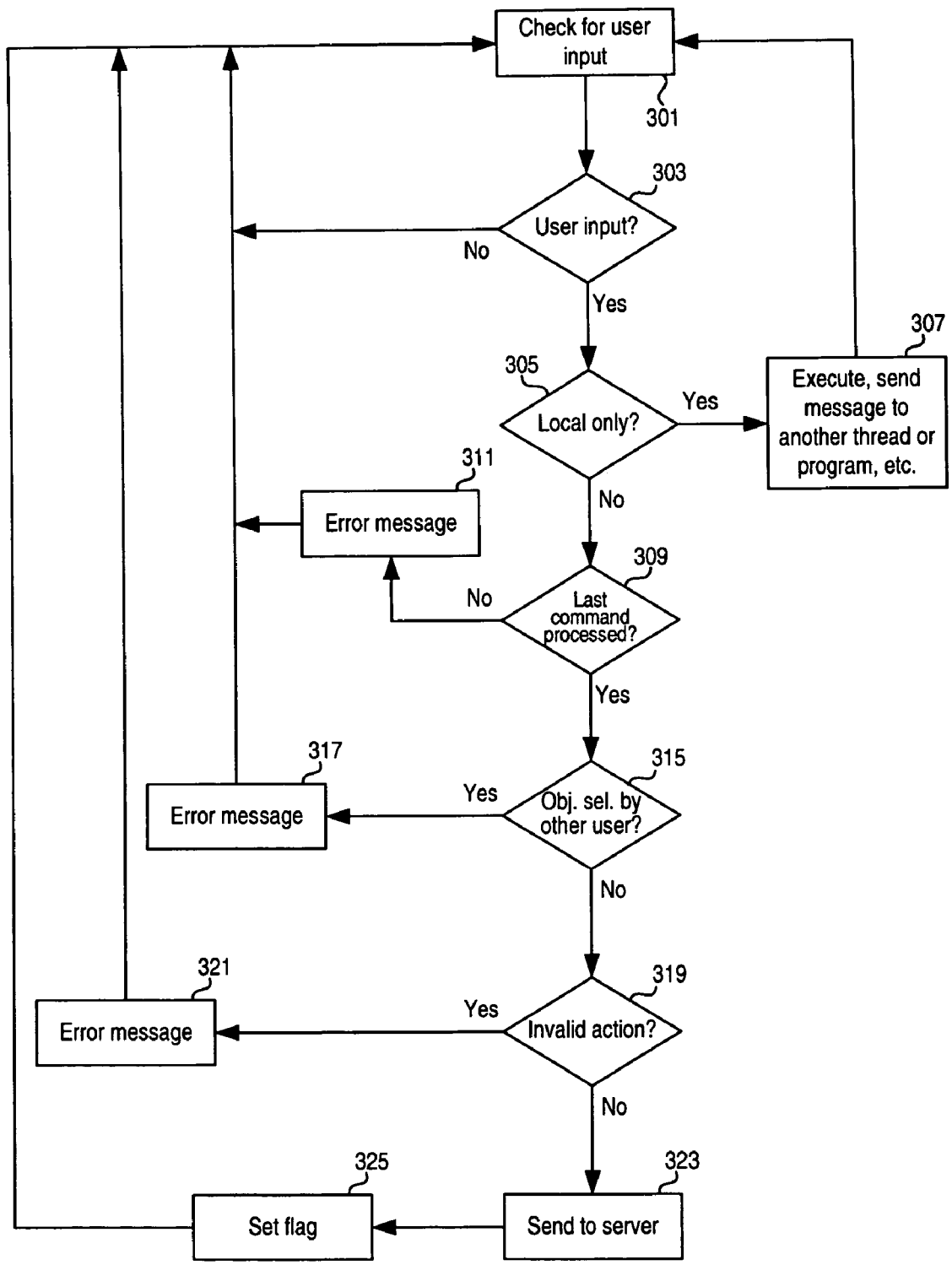
FIG. 7 is a flow chart showing capture of user input according to at least some embodiments.

In at least some embodiments, the input capture component and the command processing component of each client execute on the client's processor(s) as separate programming threads. FIG. 7 is a flow chart showing, according to at least some embodiments of the invention, an algorithm for operation of the input capture thread in any of clients A through C in the previous drawing figures. Beginning in block 301, the algorithm determines whether there has been any user input. Flow then proceeds from block 301 to block 303. If there is currently no user input, the algorithm loops back to block 301 along the "no" branch. If there is user input, the algorithm proceeds to block 305 along the "yes" branch. In block 305, the algorithm then determines whether the input corresponds to an action that need not be forwarded to the server. Certain actions will not affect the local copy of the PCB design stored at the client or otherwise require corresponding action by other clients. Examples of such actions include generating reports at the client (e.g., printing a list of all vias and traces), changing certain display properties (e.g., change background color from black to green, changing magnification), etc. If the user input corresponds to such a "local only" action, the algorithm proceeds on the "yes" branch from block 305 to block 307. In block 307, the appropriate action is taken (e.g., execute a local only command, send a message to another thread or another program, etc.). From block 307, the algorithm returns to block 301.

If it is determined in block 305 that the user input does not correspond to a "local only" action, the algorithm proceeds on the "no" branch to block 309. In block 309, the algorithm determines whether the last command transmitted to the server from the client executing the algorithm has been received back from the server and processed. In at least some embodiments, the algorithm checks the status of a flag corresponding to the last command sent to the server. That flag is set when a command is transmitted to the server, and is cleared after that command is received back from the server and processed by the client. If the last command sent to the server has not been received back from the server and processed, the algorithm proceeds on the "no" branch to block 311. In block 311, an error message is displayed to the user to advise that the input cannot be accepted until a pending command is completed. If the last command sent from the client has been received back from the server and processed, the algorithm proceeds on the "yes branch to block 315.

In block 315, the algorithm determines if the user input indicates the user is attempting to select an object currently selected by another user. This is similar to the determination previously described in connection with command 125 and FIG. 5H. In block 315, however, the client will have been advised of the other client's selection before transmitting a command that attempts to select the same object. If the user is attempting to select an object already selected by another user, the algorithm proceeds on the "yes" branch to block 317. An error message (similar to the message shown in FIG. 5H) is generated, a command corresponding to the disallowed object selection is not transmitted to the server, and the algorithm then loops back to block 301.

If it is determined in block 315 that the user is not attempting to select an object selected by another user, the algorithm proceeds on the "no" branch to block 319. In block 319, the algorithm determines if the user is otherwise attempting to perform an invalid action. For example, the user may try to place an object in a location that is already occupied by, or is too close to (based, e.g., on system or project design rules), another object. This is similar to the determination previously described in connection with command 134 and FIG. 5K. In block 319, however, the client will have been made aware of the condition preventing the currently-desired action before transmitting a command that attempts to perform the currently-desired action. If the user is attempting to perform an invalid action, the algorithm proceeds on the "yes" branch to block 321. An error message (similar to the message shown in FIG. 5K) is generated, and the algorithm then loops back to block 301.

If it is determined in block 319 that the user is not attempting to perform an invalid action, the algorithm proceeds on the "no" branch to block 323. In block 323, the algorithm generates one or more commands corresponding to the user input and sends those commands to the server. The algorithm then proceeds to block 325 and sets the flag (previously checked in block 309) indicating that there is a pending command from the client. The algorithm then loops back to block 301.

Figure 8:
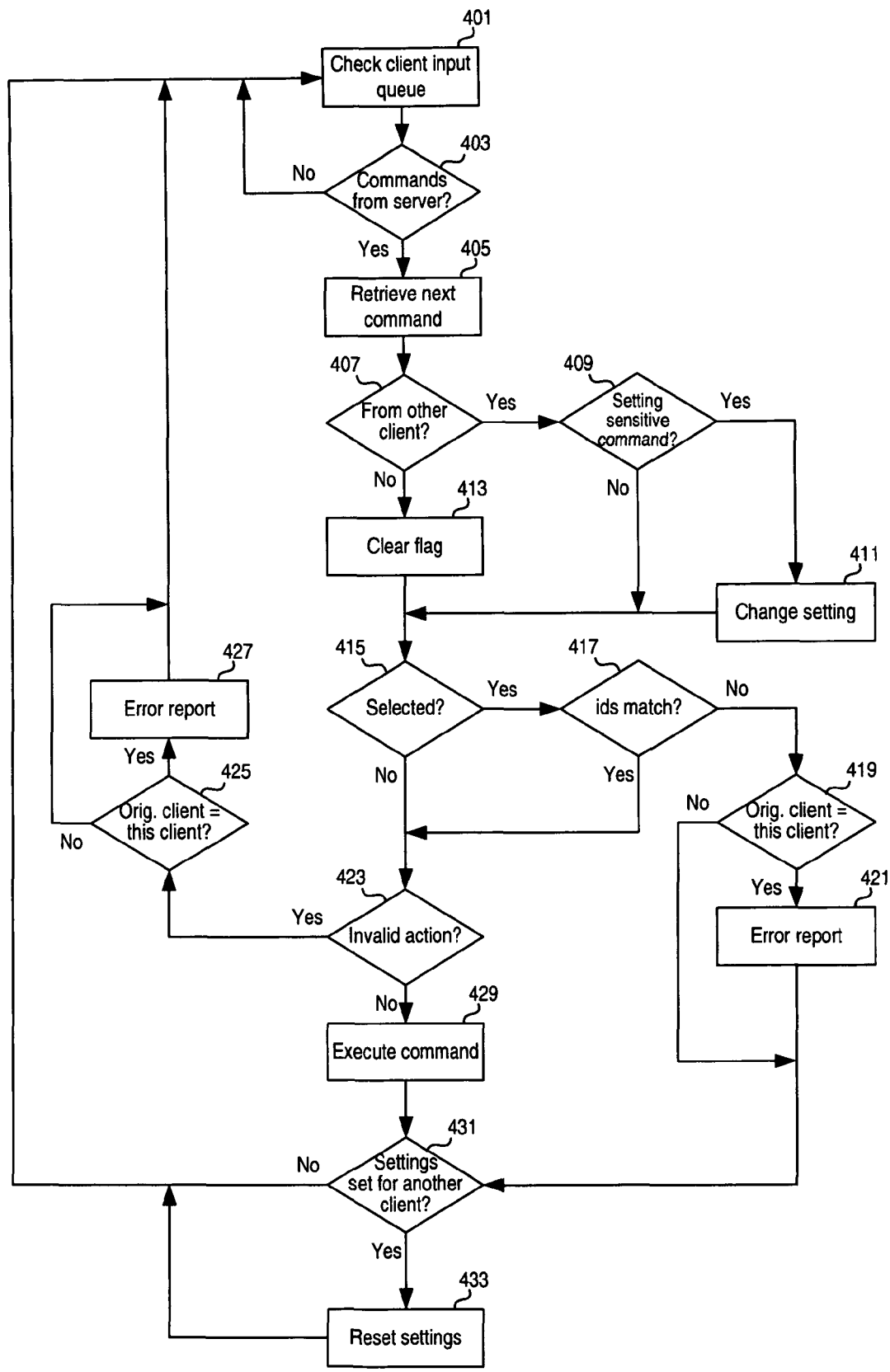
FIG. 8 is a flow chart showing processing of commands by a client according to at least some embodiments.

FIG. 8 is a flow chart showing, according to at least some embodiments of the invention, an algorithm for operation of the command processing thread in any of clients A through C in the previous drawing figures. Beginning in block 401, the input queue of the client is checked for any commands received from the server. Although not shown in the previous drawings figures, each client also includes an input queue. As the client receives commands forwarded by the server, those commands are placed in the client input queue in the order received. The client then processes commands from the queue in the same order. After checking the input queue in block 401, the algorithm determines (at block 403) if the input queue contains any commands. If not, the algorithm loops on the "no" branch back to block 401. If the input queue does contain commands, the algorithm proceeds on the "yes" branch to block 405 and retrieves the next command.

From block 405, the algorithm proceeds to block 407 and determines if the current command (i.e., the command currently being processed) originated at a client other than the client performing the FIG. 8 algorithm. If not, the algorithm proceeds on the "no" branch to block 413. At block 413, the algorithm clears the flag previously set when the command was first sent to the server from the client (block 325 of FIG. 7). From block 413 the algorithm proceeds to block 415, which is discussed below. If the algorithm determines at block 407 that the current command did originate from another client, the algorithm proceeds on the "yes" branch to block 409. In block 409, the algorithm determines whether the current command is of a type which will be affected by client settings. Some commands will have the same effect on the PCB design regardless of any client setting, and thus adjusting the executing client settings to match those of the originating client would be unnecessary. If the current command is not one which requires changing to the originating client settings, the algorithm proceeds on the "no" branch from block 409 to block 415. If changing to the originating client settings is appropriate, the algorithm proceeds on the "yes" branch to block 411 and makes the required setting changes. From block, 411 the algorithm then proceeds to block 415.

In block 415, the algorithm determines if the current command requires selection or other action on an object that has already been selected by another user (e.g., if a "selected/unselected" flag has a "selected" state). If not, the algorithm proceeds the "no" branch to block 423 (described below). Otherwise, the algorithm proceeds on the "yes" branch to block 417. In block 417, the algorithm determines if the identifier for the client originating the current command matches the identifier contained in the selected object. If the identifiers match, the algorithm proceeds on the "yes" branch to block 423. If the identifiers do not match, the algorithm proceeds on the "no" branch to block 419. In block 419, the algorithm determines if the current command originated from the client in which the FIG. 8 algorithm is executing. If so, the algorithm proceeds on the "yes" branch to block 421 and generates an error message (similar to the message shown in FIG. 5H) and then proceeds to block 431. If not, the algorithm proceeds on the "no" branch directly to block 431 (described below).

If it was determined at block 415 that the current command will not require selection or other action on a previously selected object, or if an identifier match was found in block 417, the algorithm determines (in block 423) whether the current command is attempting an invalid action. As previously discussed, an invalid action may be an action which will result in a conflict between design objects. An invalid action might also be an action which a particular user is not authorized to perform, an action which will cause a rule violation, etc. If the current command is attempting an invalid action, the algorithm proceeds on the "yes" branch to block 425. In block 425, the algorithm determines whether the current command originated at the client executing the algorithm. If so, processing continues to block 427. An error report (similar to the error report in FIG. 5K) is generated in block 427, after which the algorithm returns to block 401. If the current command originated from some other client, the algorithm proceeds on the "no" branch from block 425 to block 401.

If it is not determined at block 423 that the current command seeks to perform an invalid action, the algorithm proceeds on the "no" branch from block 423 to block 429. In block 429, the current command is executed. Any changes required by the current command to the local copy of the PCB design at the executing client are made. From block 429, the algorithm proceeds to block 431. If the executing client settings were changed for the just-executed command, the algorithm proceeds on the "yes" branch to block 433 and returns the executing client to its original settings. From block 433, the algorithm returns to block 401. If the executing client settings were not changed for the just-executed command (e.g., client A just executed a command originating at client A), the algorithm returns to block 401 on the "no" branch.

Figure 9:
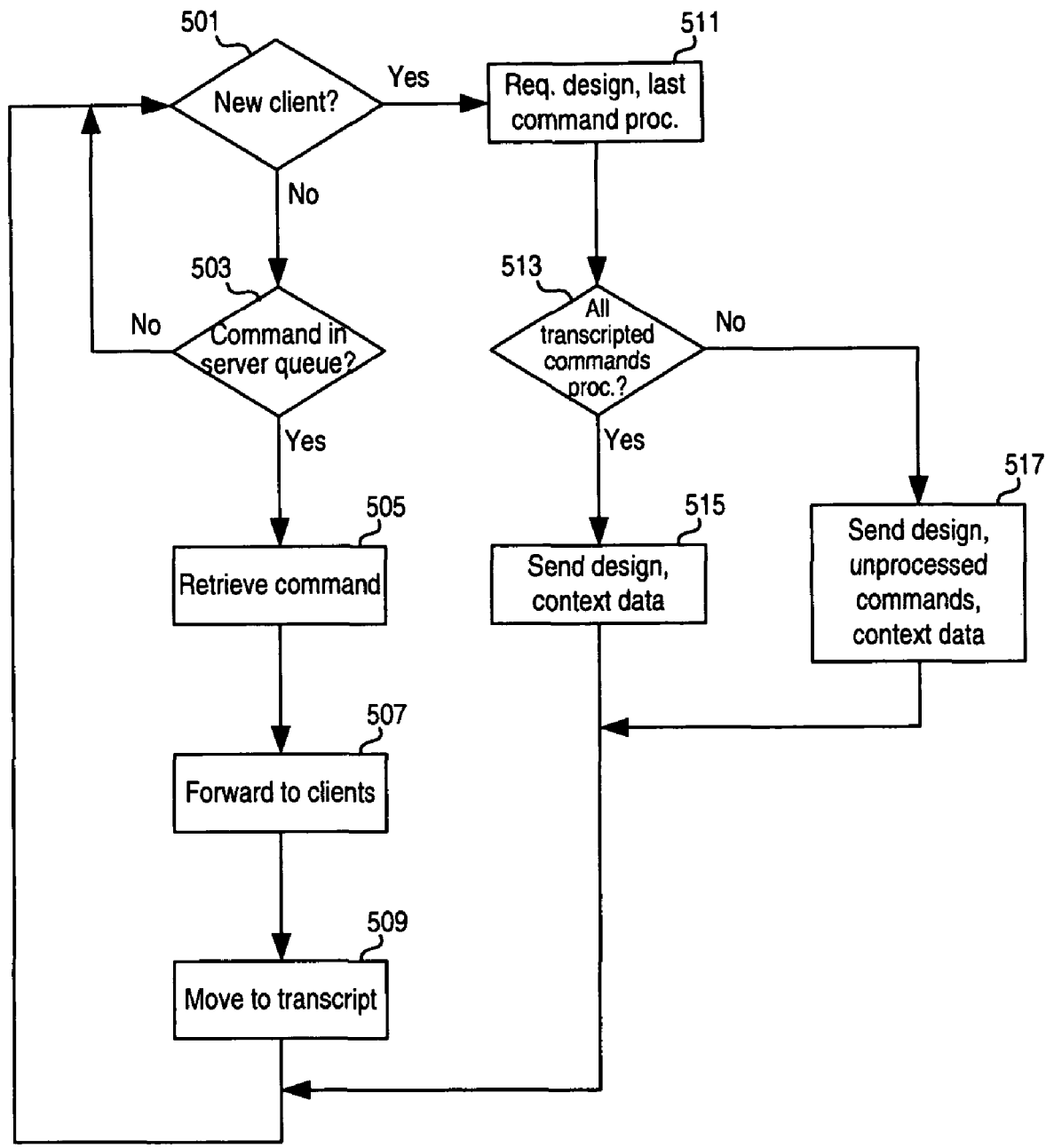
FIG. 9 is a flow chart showing operation of a server according to at least some embodiments.

FIG. 9 is a flow chart showing an algorithm for operation of a server according to at least some embodiments of the invention. The algorithm of FIG. 9 is performed by the forwarding component and/or other software components executing on one or more processor(s) of the server. Beginning in block 501, the algorithm determines if a new client is seeking to join an ongoing editing session. If so, the algorithm proceeds on the "yes" branch to block 511, which is discussed below. If not, the algorithm proceeds on the "no" branch to block 503. In block 503, the algorithm determines if there is a command in the server queue (e.g., queue 60 in FIG. 6). If not, the algorithm loops back to block 501 on the "no" branch. If so, the algorithm proceeds on the "yes" branch to block 505. In block 505, the next command in the queue is retrieved. The algorithm then proceeds to block 507, where the retrieved command is forwarded to all clients in the current editing session. The algorithm then continues to block 509, where the just-forwarded command is moved to the transcript storage (e.g., transcript storage 64 in FIG. 6). From block 509, the algorithm loops back to block 501.

If it was determined at block 501 that a new client is seeking to join the editing session, the algorithm proceeds on the "yes" branch from block 501 to block 511. In block 511, the algorithm requests from one of the current clients (e.g., client C in FIG. 6) a copy of the PCB design, context data and the last command processed by that client. The algorithm then proceeds to block 513 and determines if all commands in the server's transcript storage have been processed by the client providing the data in block 511. If all commands have been processed, the algorithm proceeds on the "yes" branch to block 515, where the PCB design copy and context data (obtained in block 511) are sent to the newly-joining client. If all commands have not been processed, the algorithm proceeds on the "no" branch to block 517. In block 517, the algorithm obtains from the server transcript all commands which have not been processed by the client providing the data in block 511. The algorithm then forwards the unprocessed commands, the PCB design copy and the context data to the newly-joining client. From either block 515 or block 517, the algorithm loops back to block 501.

In the algorithms of FIGS. 7 and 8, a first client's settings are modified when processing a command that originated at a second client (block 411 of FIG. 8). When processing of that second client's command is completed, the first client's settings are changed back to the values corresponding to design changes originating at the first client (block 433 of FIG. 8). In alternate embodiments, client settings are not automatically reset. In other words, once a client's settings are modified in these alternate embodiments, those settings are not modified again until there is some event that requires a change of settings.

Figure 10:
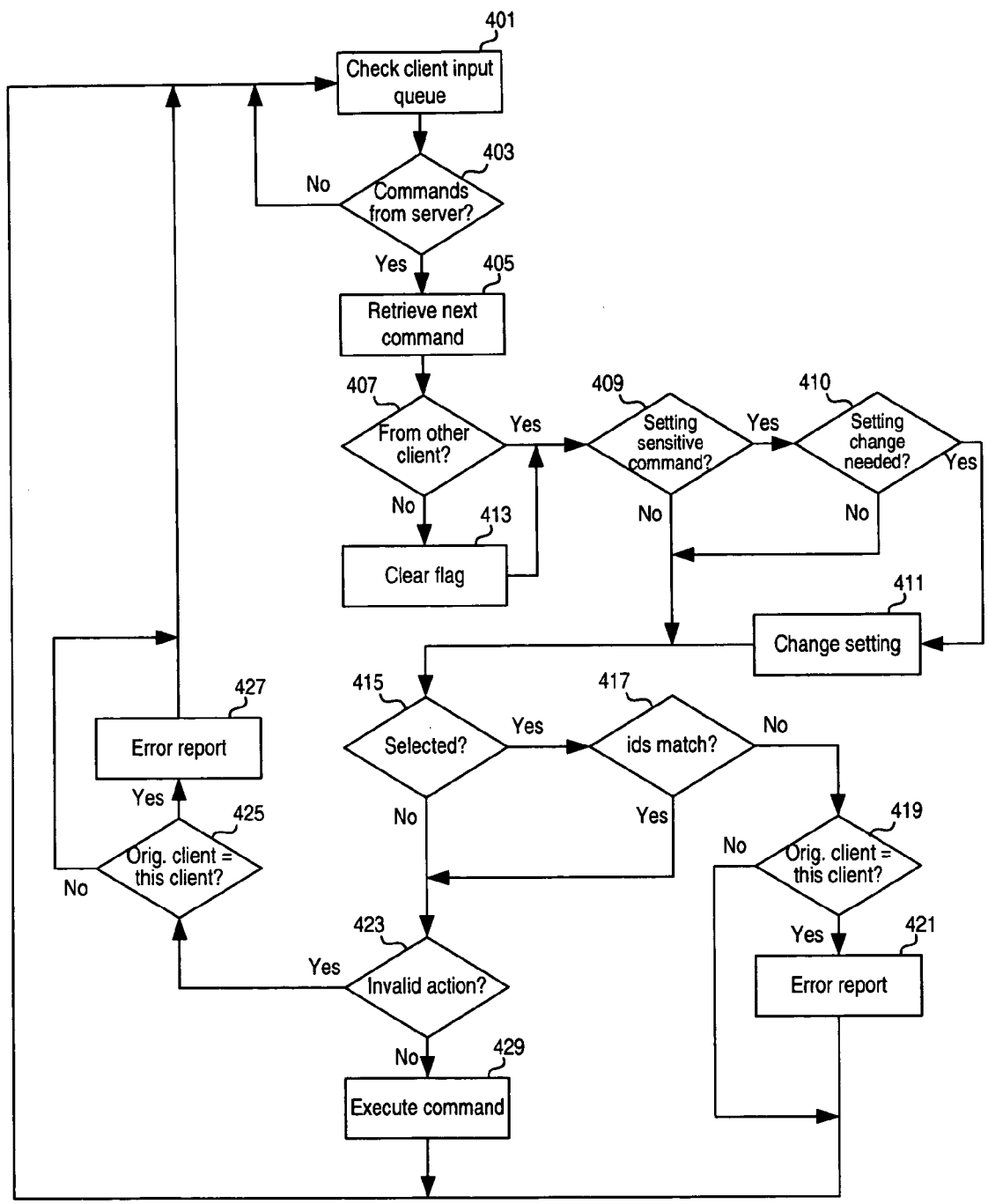
FIGS. 10 and 11 are flow charts showing operation of a client according to certain alternate embodiments.

FIG. 10 is a flow chart showing an algorithm for a client command processing thread according to at least some of these alternate embodiments. FIG. 10 is similar to FIG. 8 in most respects. Unlike FIG. 8, however, the algorithm of FIG. 10 does not include block 431 and 433. Thus, when a first client performing the FIG. 10 algorithm completes processing of a command from a second client, the first client does not reset its settings from those of the second client to those of the first client. FIG. 10 also differs from FIG. 8 in several other ways. Specifically, the FIG. 10 algorithm proceeds from block 413 to block 409 and includes an additional block 410. As in FIG. 8, the algorithm of FIG. 10 determines in block 409 whether the command being processed is a setting-sensitive command. If not, the algorithm proceeds to block 415 as in FIG. 8. If the command is a setting sensitive command, however, the FIG. 10 algorithm proceeds to block 410. In block 410, the algorithm determines if a setting change is needed before processing the current command. If, for example, the last command processed was from the second client and the current command is from the first client, the settings should be changed to those of the first client. If setting changes are appropriate, the algorithm proceeds on the "yes" branch to block 411, changes settings, and then proceeds to block 415. If it is determined in block 410 that no setting changes are needed (e.g., last command and the current command originated at the same client), the algorithm proceeds to block 415 without changing settings.

Figure 11:
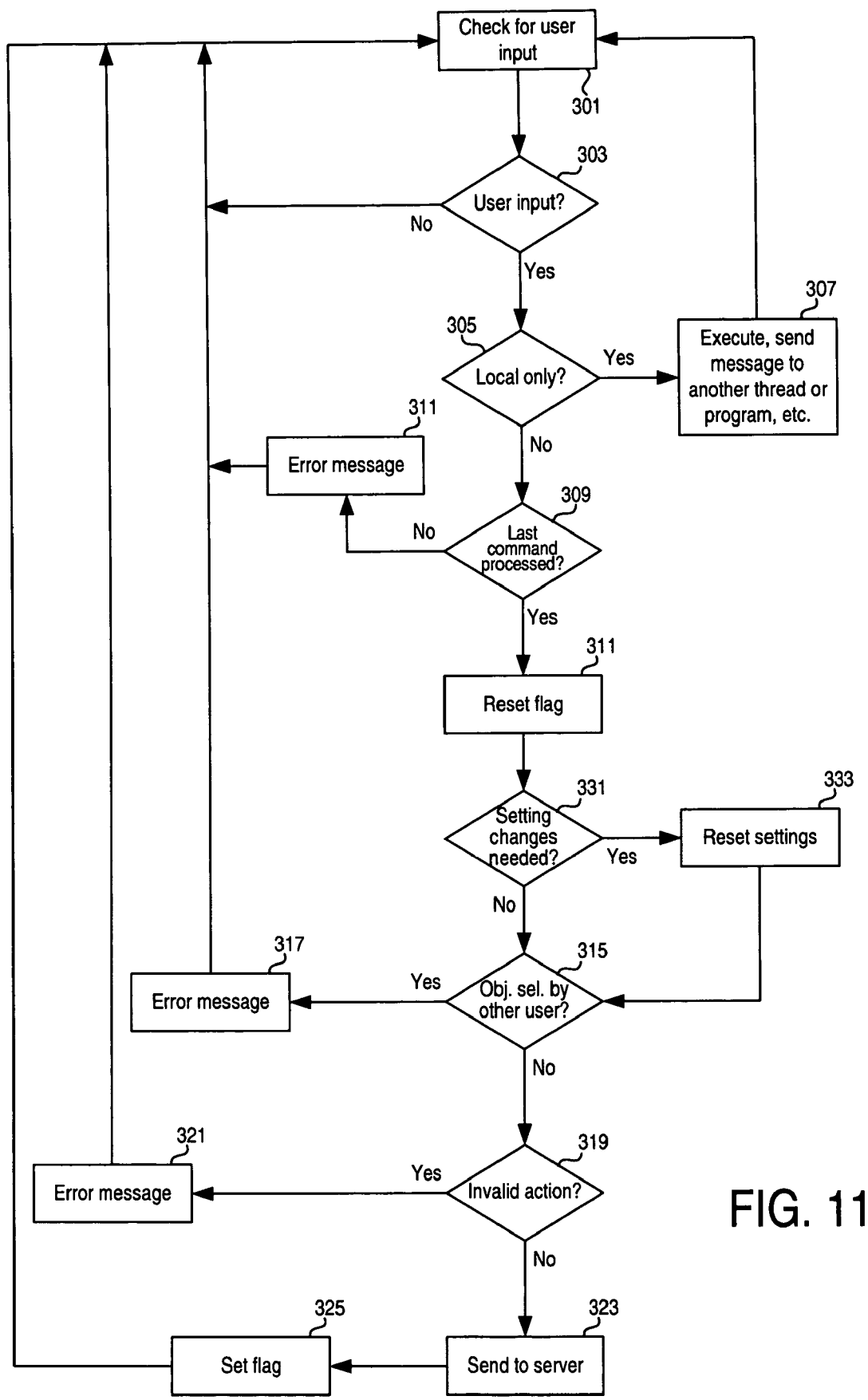

If a client's settings are not automatically reset after processing a command from another client, those other-client settings may still be in place when a user attempts to provide design edit input. If, for example, a first client user provides input immediately after the first client has processed a command from a second client, the first client user might unknowingly request a design change based on second client settings. Accordingly, at least some of the alternate embodiments employing the FIG. 10 algorithm also perform additional steps in a command capture algorithm. FIG. 11 is a flow chart showing one such alternate command capture algorithm. The algorithm of FIG. 11 is substantially similar to that of FIG. 7, with the exception of added blocks 331 and 333. In block 331, the algorithm determines if setting changes are appropriate (e.g., the client is processing user input received immediately after the client processed a command from another client). If so, the algorithm proceeds on the yes branch to block 333 and adjusts the settings. Otherwise, the algorithm proceeds on the no branch from block 331 to block 315.

As can be appreciated by persons skilled in the art in view of the preceding description, at least some embodiments of the invention offer various advantages. Because clients and the server communicate design change commands instead of the design changes themselves, network communications are reduced. In particular, many commands to make particular design changes can be represented using substantially less data than would be required to describe the change once it has been made. Sending design changes to a server which queues all change requests and resends them to all clients allows changes to be made in the same order at each of those clients. Similarly, invalid changes can be prevented, thereby reducing the need to reverse changes.

In some embodiments, design change commands are communicated between clients and the server in the AMPLE scripting language (available from Mentor Graphics Corporation of Wilsonville, Oreg.), with only scripted commands being sent from clients to the server. However, the invention is not limited to a particular language, operating system, or other specific computer environment. There are numerous other variations that are within the scope of the invention. For example, data in addition to change commands (scripted or otherwise) may be communicated between clients and the server. Commands sent from a server to the client may be modified at the server, and may be returned to a client in a form which is not strictly identical to that in which the command was initially sent by the client. Indeed, the information sent by a client or server may not be an executable command. For example, a client might simply transmit information that briefly describes the desired change. The server could then generate an executable command and forward that command to all clients. In yet another variation, the server could receive information from a client briefly describing a desired change and the server may then send the clients the same or different information describing the same change, with the clients then creating executable commands.

In the above-described embodiments, the server did not store a copy of the design. Instead, client C was relied upon to serve as the primary database for the design. In other embodiments, however, the server may also store the design. In some such embodiments, the server includes software components to make changes to the design based on commands (or other requests) received from the clients.

In at least some embodiments, setting information is conveyed to the clients in other manners. For example, and rather than maintaining a context component at each client, each command forwarded from the server includes setting data associated with the command (e.g., as metadata, etc.). This setting data may be transmitted to the server from a client when the command is initially generated at the client.

In still other embodiments, a client display is updated to indicate that an object has been selected. The selection can be indicated in any of various ways. For example, bolding, highlighting, color changes, textual balloons, etc. can be used to show that an object has been selected.

In some embodiments, each command includes a command number or other type of index. This index is then used by each client to verify that commands are performed in the correct order. For example, several consecutive commands might have the following indices: 0002304, 0002305, 0002306 and 0002307. These indices can then be used by the client to confirm the commands are processed in the proper order. By way of illustration, some network protocols might cause commands to be delivered to clients in an order different from that in which the commands are forwarded by the server. The indices could also be used to detect that a command is missing. Continuing the prior example, the client might only receive commands 0002304, 0002305 and 0002307. Based on the indices received, the client could quickly determine that command 0002306 has been dropped. This could occur because of network problems or for any of various other reasons. Upon detecting the missed command, the client would then ask the server to resend command 0002306, and the client would not process command 0002307 (or subsequent commands) until command 0002306 had been received and processed. The server could similarly use such indices to confirm that it has received all commands transmitted from a particular client and/or to confirm the order of those commands.

Although several examples of carrying out the invention have been described, those skilled in the art will appreciate that there are numerous variations and permutations of the above described examples that fall within the spirit and scope of the invention as set forth in the appended claims. The algorithms, system configurations and other aspects described are merely examples. Modifications of the described algorithms, systems and aspects are within the scope of the invention, as are numerous other algorithms, configurations and aspects. It is to be understood that the subject matter defined in the appended claims is not necessarily limited to the specific features or acts described above. Rather, the specific features and acts described above are disclosed as example forms of implementing the claims. In the claims, various portions are prefaced with letter or number references for convenience. However, use of such references does not imply a temporal relationship not otherwise required by the language of the claims.

The invention claimed is:

1. A non-transitory machine-readable medium having stored thereon data representing sequences of instructions that, when executed by a processor, cause the processor to perform steps of a method comprising:
    (a) receiving at a first computer user input indicating a first requested change to a printed circuit board design;
    (b) transmitting data corresponding to the first requested change to a second computer;
    (c) receiving at the first computer a communication from the second computer corresponding to the first requested change;
    (d) in response to the communication received in step (c), making the first requested change to a copy of the printed circuit board design stored at the first computer;
    (e) receiving multiple additional communications from the second computer, wherein each of the multiple additional communications corresponds to a subsequent requested change to the printed circuit board design,
        each of the subsequent requested changes is a different change,
        at least one of the subsequent requested changes originated at the first computer,
        at least one of the subsequent requested changes originated at a computer which is not the first computer, and
        each of the multiple additional communications and the communications received in step (c) includes an identifier associated with the originating computer for the requested change corresponding to the communication;

(f) determining, for each of the communications received in steps (c) and (e), the originating computer for the corresponding requested change; and (g) prior to making each of the subsequent requested changes to the copy of the printed circuit board design stored at the first computer, adjusting settings of the first computer to match settings of the originating computer for that requested change, the adjusting being performed without modifying the copy of the printed circuit board design, wherein for each of the subsequent requested changes, altering at least one of the settings of the first computer will cause that requested change to be made in a different manner, and wherein the settings of the first computer include a trace width or via diameter.

2. The non-transitory machine-readable medium of claim 1, comprising further instructions for performing the steps of:

(h) receiving a communication from the second computer corresponding to a second requested change to the printed circuit board design, the second requested change originating from a computer other than the first computer; and (i) in response to the communication received in step (h), making the second requested change to the copy of the printed circuit board design stored at the first computer, wherein step (h) occurs after step (a) but before step (c), and step (i) occurs before step (d).

3. The non-transitory machine-readable medium of claim 2, wherein the settings of the first computer comprise parameter values of printed circuit board design-editing software that are applied when performing modifications to the copy of the printed circuit board design stored at the first computer.

4. The non-transitory machine-readable medium of claim 1, wherein the data transmitted in step (b) comprises a command, the execution of which will cause the first requested change to be made to the copy of the printed circuit board design stored at the first computer, the communication received in step (c) comprises the command transmitted in step (b), and step (d) comprises executing the command received in step (c).

5. The non-transitory machine-readable medium of claim 1, wherein at least one of the subsequent requested changes originated at a third computer.

6. The non-transitory machine-readable medium of claim 1, comprising further instructions for performing the steps of:

(h) receiving a communication at the first computer from the second computer corresponding to a second requested change to the printed circuit board design, the second requested change originating from one of the second computer or a third computer;

(i) determining that the second requested change requires action on a printed circuit board design object that is currently selected by a user not associated with the originating computer of the second requested change; and (j) in response to the determination of step (i), rejecting the second requested change.

7. The non-transitory machine-readable medium of claim 1, comprising further instructions for performing the steps of:

(h) receiving a communication from the second computer corresponding to a second requested change to the printed circuit board design;

(i) determining that the second requested change seeks to perform an invalid action; and (j) in response to the determination of step (i), rejecting the second requested change.

8. The non-transitory machine-readable medium of claim 1, comprising further instructions for performing the steps of:

(h) receiving at the first computer user input indicating a second requested change to the printed circuit board design;

(i) determining that the second requested change requires action on a printed circuit board design object that is currently selected by a user not associated with the first computer; and (j) based on the determination of step (i), not transmitting to the second computer data corresponding to the second requested change.

9. The non-transitory machine-readable medium of claim 1, comprising further instructions for performing the steps of:

(h) receiving at the first computer user input indicating a second requested change to the printed circuit board design;

(i) determining that the second requested change requires performing an invalid action; and (j) based on the determination of step (i), not transmitting to the second computer data corresponding to the second requested change.

10. The non-transitory machine-readable medium of claim 1, comprising further instructions for performing the steps of:

(h) receiving at the first computer user input relating to the printed circuit board design;

(i) determining that the user input received in step (e) will not require change to the printed circuit board design;

(j) based on the determination of step (i), not transmitting to the second computer data corresponding to the user input received in step (h); and (k) performing an action requested by the input received in step (h).

11. A non-transitory machine-readable medium having stored thereon data representing sequences of instructions that, when executed by a processor, cause the processor to perform steps of a method comprising:

(a) receiving transmissions from a plurality of client computers, the transmissions including data corresponding to changes to a printed circuit board design, each of the changes being requested by a sending client computer but not yet performed by the sending client computer;

(b) queuing the changes for which transmissions are received in step (a);

(c) forwarding information regarding each of the queued changes to each of the client computers for entry of one or more of those changes by each of the client computers, wherein information for the queued changes is forwarded in the same order in which data corresponding to those changes was received in step (a);

(d) receiving, subsequent to step (c), a request from a new client to join an editing session;

(e) in response to the request of step (d), forwarding to the new client a copy of the printed circuit board design and information corresponding to at least one of the queued changes, wherein the copy of the printed circuit board design does not include the at least one of the queued changes; and (f) in response to the request of step (d), forwarding to the new client data regarding settings of each client computer of the plurality, wherein the settings of each client computer include values which can be modified without modifying the copy of the printed circuit board design, wherein modifying one or more values causes one of the at least one queued changes to be made in a different manner, and wherein the settings of each client computer include a trace width or via diameter.

12. The non-transitory machine-readable medium of claim 11, wherein the processor does not make the queued changes to the printed circuit board design.

13. The non-transitory machine-readable medium of claim 11, comprising further instructions for performing step comprising:
- (g) obtaining, in response to step (d) and from a client computer of the plurality, the copy of the printed circuit board design and data indicating the at least one of the requested changes not included in the copy of the printed circuit board design.

14. A computerized system for modifying a design, comprising:
- a server;
- a first client; and
- a second client, wherein each of the first and second clients is configured to perform steps that include
- (c1) receiving user input indicating requested changes to the printed circuit board design,
- (c2) transmitting to the server data corresponding to the requested changes,
- (c3) receiving communications from the server corresponding to the requested
- (c4) in response to the communications received in step (c3), making the requested changes to a local copy of the printed circuit board design stored at the client,
- (c5) receiving communications from the server corresponding to requested printed circuit board design changes originating at the other of the first and second client,
- (c6) making, to the local copy of the printed circuit board design and in response to the communications received in step (c5), the requested printed circuit board design changes originating at the other of the first and second clients,
- (c7) determining, prior to making the changes in steps (c4) and (c6), and for each of the communications received in steps (c3) and (c5), the originating client for the requested printed circuit board design change corresponding to the received communication, and
- (c8) prior to making each of the changes in steps (c4) and (c6), adjusting settings of the client to match settings of the originating client for the change being made, the adjusting being performed without modifying the copy of the printed circuit board design, wherein
- for each change being made, altering at least one of the settings of the client will cause that change to be made in a different manner, and wherein the settings of the client include a trace width or via diameter.

15. The computerized system of claim 14, wherein the settings of the client comprise parameter values of printed circuit board design-editing software that are applied when performing modifications to the local copy of the printed circuit board design stored at the client.

16. The computerized system of claim 14, wherein the server is configured to perform steps of a method that include:
- (s1) receiving the transmissions from the clients corresponding to the requested changes,
- (s2) queuing the requested changes, and
- (s3) forwarding, in the same order in which data corresponding to the requested changes was received in step (s1), information regarding each of the requested changes to each of the first and second clients, and wherein each client is configured to make changes to its local printed circuit board design copy in the same order in which the communications corresponding to those changes are forwarded from the server.

17. The computerized system of claim 16, further comprising a third client, and wherein the server is configured to perform steps that include:
- (s4) receiving, subsequent to step (s3), a request from the third client to join an editing session, and
- (s5) in response to the request of step (s4), forwarding to the third client a copy of the printed circuit board design and information corresponding to at least one of the requested changes, wherein the copy of the printed circuit board design does not include the at least one requested change.

18. The computerized system of claim 17, wherein the server is configured to perform steps that include:
- (s6) in response to the request of step (s4), forwarding to the third client data regarding settings of the first and second clients, wherein each of the settings has a value which can be modified to cause at least one the requested changes to be made in a different manner.

19. The computerized system of claim 18, wherein the server and the second client are operating on the same computer.

* * * * *

UNITED STATES PATENT AND TRADEMARK OFFICE
CERTIFICATE OF CORRECTION

PATENT NO. : 8,326,926 B2  
APPLICATION NO. : 11/223976  
DATED : December 4, 2012  
INVENTOR(S) : Venkanna Sangem Page 1 of 1

It is certified that error appears in the above-identified patent and that said Letters Patent is hereby corrected as shown below:

Title Page  
Item (56), under Other Publications:  
    Please insert --English translation of document titled "Exhibits and other documents" submitted September 29, 2006 in Japanese Patent Application No. 2003-551734, pages 1-5.--

Signed and Sealed this  
Eighth Day of October, 2013

Teresa Stanek Rea  
*Deputy Director of the United States Patent and Trademark Office*